(12) United States Patent
Kim et al.

(10) Patent No.: US 11,093,111 B2
(45) Date of Patent: Aug. 17, 2021

(54) METHOD AND APPARATUS FOR CONTENTS MANAGEMENT IN ELECTRONIC DEVICE

(71) Applicant: SAMSUNG ELECTRONICS CO., LTD., Suwon-si (KR)

(72) Inventors: Eunsun Kim, Seoul (KR); Iseul Song, Suwon-si (KR); Ji-Yeon Yoo, Yongin-si (KR); Hyeonseung Lee, Seoul (KR); Moonyoung Kim, Seongnam-si (KR); Jaehee Moon, Seoul (KR); Sangho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 15/689,346

(22) Filed: Aug. 29, 2017

(65) Prior Publication Data

US 2018/0059884 A1   Mar. 1, 2018

(30) Foreign Application Priority Data

Aug. 29, 2016   (KR) .................. 10-2016-0110356

(51) Int. Cl.
  *G06F 3/00*   (2006.01)
  *G06F 3/0482*   (2013.01)
  (Continued)

(52) U.S. Cl.
  CPC ............ *G06F 3/0482* (2013.01); *G06F 3/041* (2013.01); *G06F 3/0488* (2013.01);
  (Continued)

(58) Field of Classification Search
  CPC .. G06F 3/0481; G06F 3/04817; G06F 3/0482; G06F 3/0488; G06F 3/04883; G06F 16/907; G06F 3/041
  See application file for complete search history.

(56) References Cited

U.S. PATENT DOCUMENTS 7,409,641 B2 * 8/2008 Moody ................ G06Q 10/107
                                                            709/206
7,523,397 B2   4/2009 Cheung et al.
(Continued)

OTHER PUBLICATIONS

International Search Report and Written Opinion dated Dec. 11, 2017 in counterpart International Patent Application No. PCTKR2017/009444.
(Continued)

*Primary Examiner* — Kieu D Vu
*Assistant Examiner* — Andrew Chung
(74) *Attorney, Agent, or Firm* — Nixon & Vanderhye P.C.

(57) ABSTRACT

A method for contents management in an electronic device can include generating a contents list, based on a user input, detecting selection of a contents list entry in the contents list, and creating one or more contents related to a content of the selected contents list entry, when creating the one or more related contents, generating a tag based on at least part of the content corresponding to the selected contents list entry, adding the tag to the one or more related contents, and adding a contents list entry of the one or more related contents comprising the tag, to the contents list.

12 Claims, 25 Drawing Sheets

(51) Int. Cl.
*G06F 3/0488* (2013.01)
*G06F 16/907* (2019.01)
*G06F 3/041* (2006.01)
*G06F 3/0481* (2013.01)

(52) U.S. Cl.
CPC ...... *G06F 3/04817* (2013.01); *G06F 3/04883* (2013.01); *G06F 16/907* (2019.01)

(56) References Cited

U.S. PATENT DOCUMENTS

| | | | |
|---|---|---|---|
| 8,200,669 B1* | 6/2012 | Lampietro | G06F 16/907 707/737 |
| 8,621,373 B2 | 12/2013 | Burtner et al. | |
| 8,866,748 B2* | 10/2014 | Sirpal | G06F 1/1632 345/169 |
| 9,001,149 B2* | 4/2015 | Sirpal | G06F 3/04842 345/619 |
| 10,386,992 B2* | 8/2019 | Shin | G06F 3/0487 |
| 10,705,682 B2* | 7/2020 | Yang | G06F 3/0482 |
| 2003/0184592 A1* | 10/2003 | Awada | G06F 3/0481 715/788 |
| 2005/0053356 A1 | 3/2005 | Mate et al. | |
| 2007/0143298 A1 | 6/2007 | Surendran et al. | |
| 2008/0028322 A1* | 1/2008 | May | G06Q 10/109 715/752 |
| 2010/0162167 A1* | 6/2010 | Stallings | G06F 3/0482 715/811 |
| 2010/0167712 A1* | 7/2010 | Stallings | G06F 3/0485 455/418 |
| 2010/0211535 A1* | 8/2010 | Rosenberger | G06F 16/48 706/20 |
| 2011/0093619 A1* | 4/2011 | Nelson | G06Q 10/06 709/248 |
| 2011/0175930 A1* | 7/2011 | Hwang | G06F 3/0488 345/629 |
| 2012/0184247 A1* | 7/2012 | Choe | H04M 1/67 455/411 |
| 2012/0185797 A1* | 7/2012 | Thorsen | G06Q 10/00 715/784 |
| 2012/0208593 A1* | 8/2012 | Yang | G06F 3/04817 455/556.1 |
| 2012/0235930 A1* | 9/2012 | Lazaridis | H04M 1/72547 345/173 |
| 2012/0317498 A1* | 12/2012 | Logan | H04L 51/24 715/752 |
| 2013/0055153 A1* | 2/2013 | Sherman | G06F 9/451 715/810 |
| 2013/0120447 A1* | 5/2013 | Kim | G06F 3/0481 345/629 |
| 2013/0145295 A1* | 6/2013 | Booking | G06F 3/017 715/764 |
| 2013/0205219 A1 | 8/2013 | Moha et al. | |
| 2013/0227482 A1* | 8/2013 | Thorsander | G06F 3/0482 715/821 |
| 2013/0227483 A1* | 8/2013 | Thorsander | G06F 3/04842 715/821 |
| 2013/0332850 A1* | 12/2013 | Bovet | H04L 51/22 715/752 |
| 2014/0033071 A1* | 1/2014 | Gruber | G06Q 10/1097 715/752 |
| 2014/0294365 A1 | 10/2014 | Spears | |
| 2015/0113446 A1* | 4/2015 | Penha | G06F 3/0484 715/753 |
| 2015/0193096 A1* | 7/2015 | Lee | G06F 3/04842 715/739 |
| 2015/0227166 A1* | 8/2015 | Lee | G06F 1/169 345/173 |
| 2015/0363092 A1* | 12/2015 | Morton | H04L 51/046 715/752 |
| 2016/0063117 A1 | 3/2016 | Carter et al. | |
| 2016/0098166 A1* | 4/2016 | Joshi | G06F 3/0486 715/769 |
| 2016/0103923 A1* | 4/2016 | Thomas | G06F 16/9535 715/234 |
| 2016/0134667 A1 | 5/2016 | Suresh et al. | |
| 2017/0269799 A1* | 9/2017 | Rathus | G06F 16/9537 |

OTHER PUBLICATIONS

India Office Action dated Feb. 3, 2021 for IN Application No. IN201947009341.

* cited by examiner

METHOD AND APPARATUS FOR CONTENTS MANAGEMENT IN ELECTRONIC DEVICE

CROSS-REFERENCE TO RELATED APPLICATION

The present application is based on and claims priority under 35 U.S.C. § 119 to a Korean patent application filed in the Korean Intellectual Property Office on Aug. 29, 2016, and assigned Serial No. 10-2016-0110356, the disclosure of which is incorporated by reference herein in its entirety.

TECHNICAL FIELD

The present disclosure relates generally to a method and an apparatus for managing contents in an electronic device to display and create contents.

BACKGROUND

Thanks to advances in electronic and telecommunication industries, a user device (e.g., a smart phone, a tablet computer, etc.) becomes a necessity in a modern life and serves as an important means for fast-changing information delivery. Such a user device facilitates a user's task through a Graphical User Interface (GUI) using a screen and provides various multimedia based on a web. The user device stores various contents such as event, email, task, and file and provides a contents-based use environment.

For example, to open one of contents in various formats, a user needs to select and execute a corresponding one of applications, which can cause inconvenience.

SUMMARY

To address the above-discussed deficiencies of the prior art, it is an example aspect of the present disclosure to provide contents management method and apparatus in an electronic device for reading a content and easily creating its related content.

Another example aspect of the present disclosure is to provide contents management method and apparatus in an electronic device for reading a content and easily accessing its related contents.

According to an example aspect of the present disclosure, a method for contents management in an electronic device may include generating a contents list, based on a user input, detecting selection of a contents list entry in the contents list, and creating one or more contents related to a content of the selected contents list entry, when creating the one or more related contents, generating a tag based on at least part of the content corresponding to the selected contents list entry, adding the tag to the one or more related contents, and adding a contents list entry of the one or more related contents comprising the tag, to the contents list.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein.

Throughout the drawings, like reference numerals will be understood to refer to like parts, components and structures.

DETAILED DESCRIPTION

Figure 1:
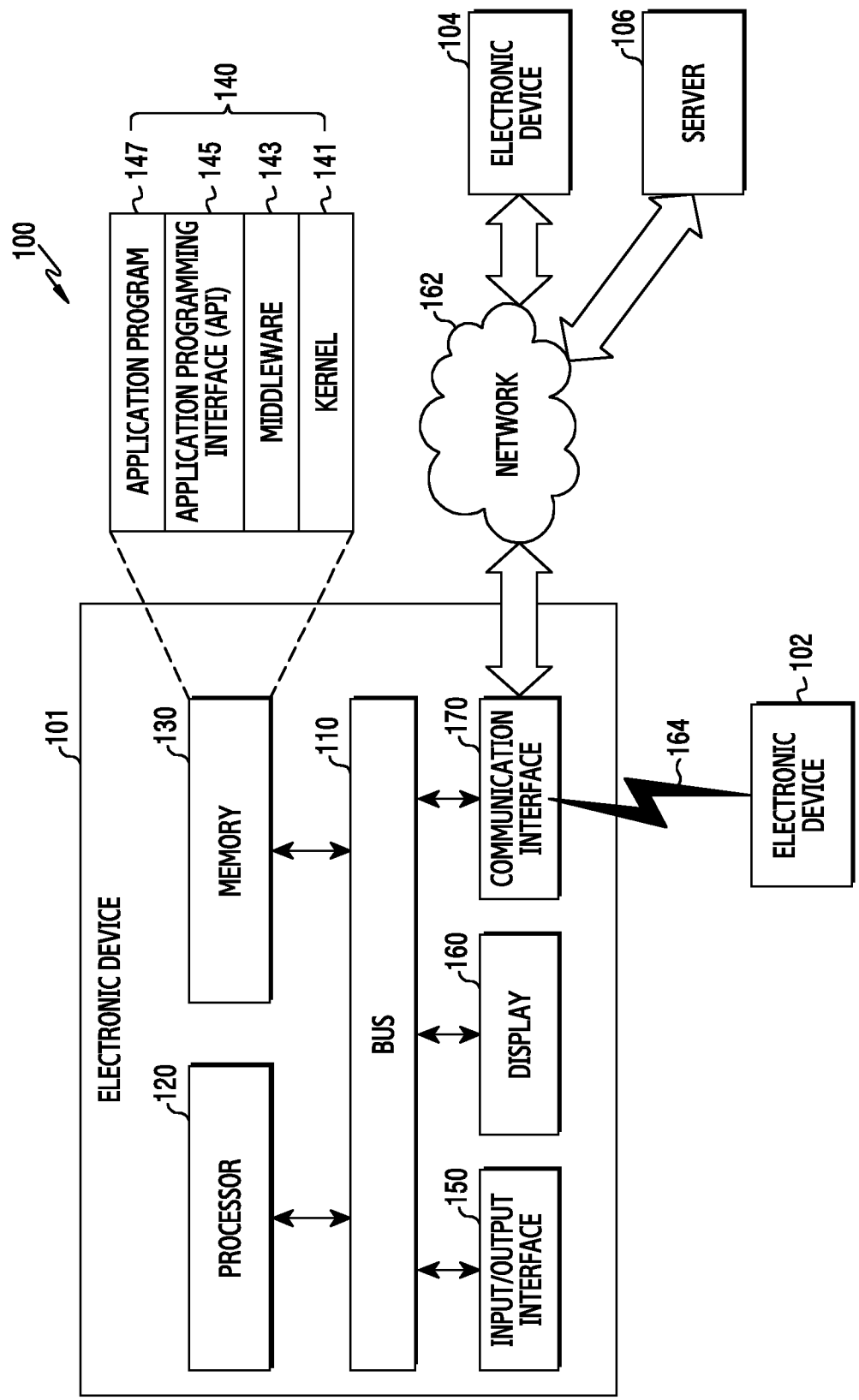
FIG. 1 is a block diagram illustrating an example electronic device in a network environment according to an example embodiment of the present disclosure.

Hereinafter, various example embodiments of the present disclosure are described in greater detail with reference to the accompanying drawings. It should be understood that it is not intended to limit embodiments and terms used herein to a particular form but is to cover various modifications, equivalents, and/or alternatives of corresponding embodiments. In the description below of the accompanying drawings, similar reference numerals can be used to designate similar elements. The singular forms can include plural referents unless the context clearly dictates otherwise. In the present disclosure, an expression such as "A or B," or "at least one of A and/or B," can include all possible combinations of the listed items. Expressions such as "first," "second," "primarily," or "secondary," can modify corresponding components regardless of order or importance, distinguish one element from another element, and do not limit corresponding elements. When it is described that an element (e.g., a first element) is "(operatively or communicatively) coupled" to or "connected" to another element (e.g., a second element), the element can be directly connected to the other element or can be connected through another element (e.g., a third element).

An expression "configured to (or set)" used in the present disclosure can be used interchangeably with, for example, "suitable for," "having the capacity to," "designed to,"

"adapted to," "made to," or "capable of" by hardware or by software according to a situation. In some situations, the expression "apparatus configured to" can refer to a situation in which the apparatus "can" operate together with another apparatus or component. For example, a phrase "a processor configured (or set) to perform A, B, and C" can indicate an exclusive processor (e.g., an embedded or dedicated processor) for performing a corresponding operation or a generic-purpose processor (e.g., a central processing unit (CPU) or an application processor (AP)) which can perform corresponding operations by executing at least one software program stored at a memory device.

An electronic device according to various embodiments of the present disclosure can include, for example, at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MPEG 3 (MP3) player, a medical equipment, a camera, or a wearable device, or the like, but is not limited thereto. The wearable device can include at least one of an accessory type (e.g., a watch, a ring, a bracelet, an ankle bracelet, a necklace, glasses, a contact lens, or a head-mounted-device (HMD)), a fabric or clothing embedded type (e.g., electronic garments), a body attachable type (e.g., a skin pad or a tattoo), or an implantable circuit, or the like, but is not limited thereto. In some embodiments, the electronic device can include as at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, or an electronic frame, or the like, but is not limited thereto.

In another embodiment, the electronic device can include as at least one of various medical devices (e.g., various portable medical measuring devices (a blood sugar measuring device, a heartbeat measuring device, a blood pressure measuring device, or a body temperature measuring device), a magnetic resonance angiography (MRA) device, a magnetic resonance imaging (MRI) device, a computed tomography (CT) device, a scanning machine, and an ultrasonic wave device), a navigation device, a global navigation satellite system (GNSS), an event data recorder (EDR), a flight data recorder (FDR), a vehicle infotainment device, electronic equipment for ship (e.g., a navigation device for ship and gyro compass), avionics, a security device, a head unit for a vehicle, an industrial or home robot, a drone, an automated teller machine (ATM) of a financial institution, a point of sales (POS) device of a store, or an internet of things (IoT) device (e.g., a light bulb, various sensors, a sprinkler device, a fire alarm, a thermostat, a street light, a toaster, sports equipment, a hot water tank, a heater, and a boiler), or the like, but is not limited thereto. According to an embodiment, the electronic device can include at least one of a portion of furniture, building/construction or vehicle, an electronic board, an electronic signature receiving device, a projector, or various measuring devices (e.g., water supply, electricity, gas, or electric wave measuring device), or the like, but is not limited thereto. According to various embodiments, the electronic device can be flexible or a combination of two or more of the foregoing various devices. The electronic device according to an embodiment of the present disclosure is not limited to the foregoing devices. The term "user", as used herein, can refer to a person using an electronic device or a device using an electronic device (e.g., an artificial intelligence electronic device).

Referring to FIG. 1, an electronic device 101 may reside in a network 100 according to various example embodiments. The electronic device 101 can include a bus 110, a processor (e.g., including processing circuitry) 120, a memory 130, an input/output interface (e.g., including input/output circuitry) 150, a display 160, and a communication interface (e.g., including communication circuitry) 170. In an embodiment, the electronic device 101 can omit at least one of the components or further include an additional component. The bus 110 can include a circuit for interconnecting the components 120 through 170 and delivering communication signals (e.g., control messages or data) between the components 120 through 170. The processor 120 may include various processing circuitry, such as, for example, and without limitation, one or more of a dedicated processor, a CPU, an AP, and a communication processor (CP). The processor 120, for example, can process operations or data regarding control and/or communication of at least other component of the electronic device 101.

The memory 130 can include a volatile and/or nonvolatile memory. The memory 130, for example, can store commands or data relating to at least other component of the electronic device 101. According to an embodiment, the memory 130 can store software and/or a program 140. The program 140 can include a kernel 141, middleware 143, an application programming interface (API) 145, and/or an application program (or "application") 147. At least part of the kernel 141, the middleware 143, or the API 145 can be referred to as an operating system (OS). The kernel 141 can control or manage system resources (e.g., the bus 110, the processor 120, or the memory 130) used for performing operations or functions implemented by the other programs (e.g., the middleware 134, the API 145, or the application program 147). Additionally, the kernel 141 can provide an interface for controlling or managing the system resources by accessing the individual component of the electronic device 101 from the middleware 143, the API 145, or the application program 147.

The middleware 143, for example, can serve an intermediary role for exchanging data between the API 145 or the application program 147 and the kernel 141 through communication. Also, the middleware 143 can process one or more job requests received from the application program 147, based on their priority. For example, the middleware 143 can assign a priority for using the system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150 can deliver commands or data inputted from a user or another external device to other component(s) of the electronic device 101, or output commands or data input from the other component(s) of the electronic device 101 to the user or another external device.

The display 160, for example, can include a liquid crystal display (LCD), a light emitting diode (LED) display, an organic light emitting diode (OLED) display, a microelectromechanical systems (MEMS) display, or an electronic paper display, or the like, but is not limited thereto. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, may include various communication circuitry and can establish communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 using wireless communication or wired communication. Additionally, the communication interface 170 may establish a short-range wireless communication connection with an electronic device (e.g., first external electronic device 102).

The wireless communication, for example, can include cellular communication using at least one of long term evolution (LTE), LTE-advanced (LTE-A), code division multiple access (CDMA), wideband CDMA (WCDMA), universal mobile telecommunications system (UMTS), wireless broadband (WiBro), and global system for mobile communications (GSM). The wireless communication can include, for example, at least one of wireless fidelity (WiFi), bluetooth, bluetooth low energy (BLE), Zigbee, near field communication (NFC), magnetic secure transmission (MST), radio frequency (RF), or a body area network (BAN). According to an embodiment, the wireless communication can include GNSS. The GNSS can include, for example, global positioning system (GPS), global navigation satellite system (GLONASS), Beidou navigation satellite system (Beidou), or Galileo (the European global satellite-based navigation system), according to its use area or bandwidth. Hereafter, the GPS can be interchangeably used with the GNSS. The wired communication, for example, can include at least one of universal serial bus (USB), high definition multimedia interface (HDMI), recommended standard 232 (RS-232), and plain old telephone service (POTS). The network 162 can include a telecommunications network, for example, at least one of a computer network (e.g., local area network (LAN) or wide area network (WAN)), Internet, and a telephone network.

Each of the first and second external electronic devices 102 and 104 can be of the same as or of a different type from the type of the electronic device 101. According to various embodiments, all or part of the operations executed in the electronic device 101 can be executed by one or more other electronic devices (e.g., the electronic devices 102 and 104, or the server 106). When performing a function or service automatically or by request, instead of or addition to performing the function or the service by the electronic device 101, the electronic device 101 can request at least part of the related function from other device (e.g., the electronic device 102 or 104, or the server 106). The other electronic device (e.g., the electronic device 102 or 104, or the server 106) can perform the requested function or an additional function and provide its result to the electronic device 101. The electronic device 101 can provide the requested function or service by processing the received result as it is or additionally. In doing so, for example, cloud computing, distributed computing, or client-server computing techniques can be used.

Figure 2:
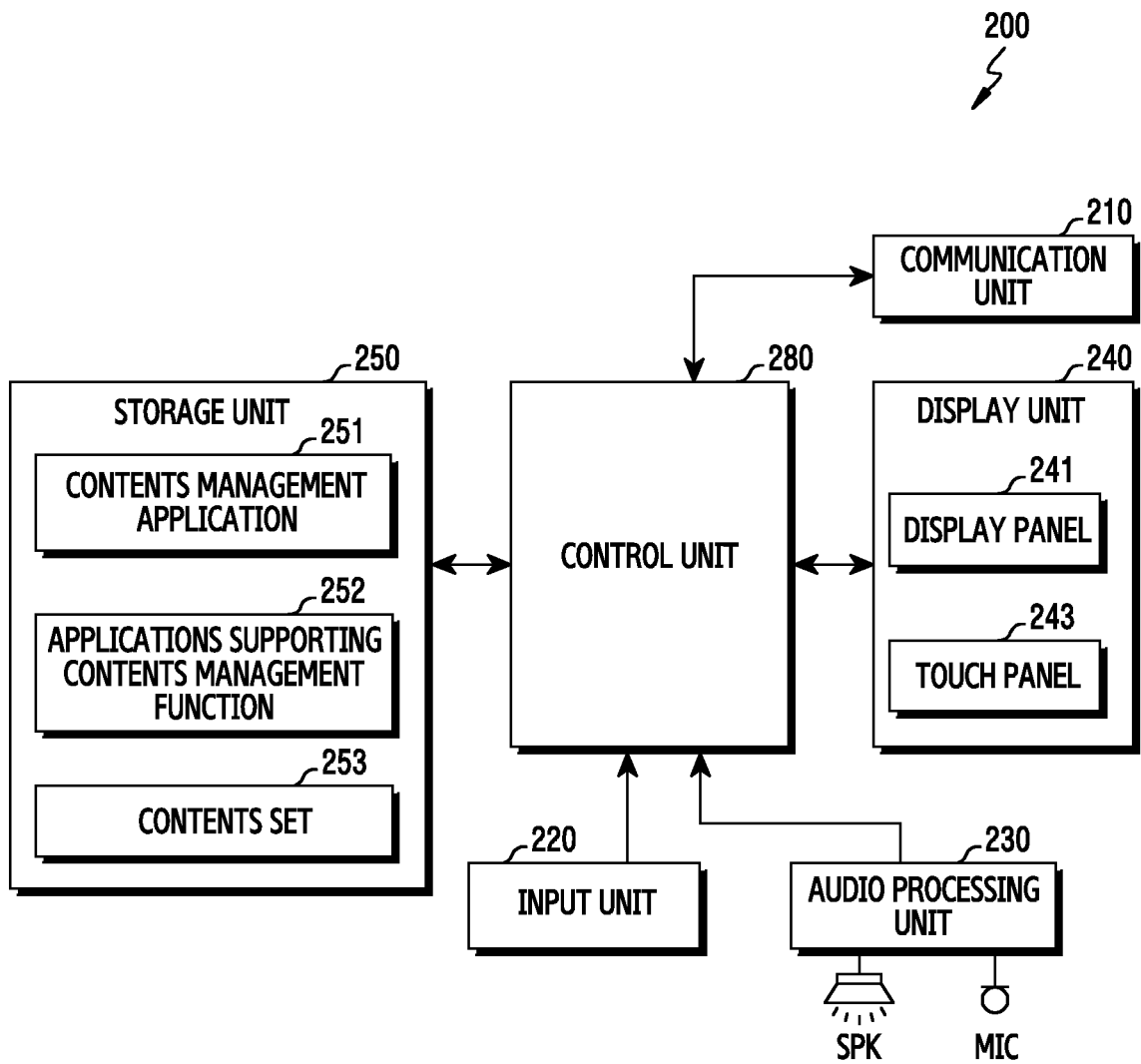
FIG. 2 is a block diagram illustrating an example electronic device supporting a contents management function according to an example embodiment of the present disclosure.

FIG. 2 is a block diagram illustrating an example electronic device supporting a contents management function according to an example embodiment of the present disclosure. According to various example embodiments, the electronic device 200 can include the electronic device 101 of FIG. 1.

Referring to FIG. 2, the electronic device 200 can include a communication unit (e.g., including communication circuitry) 210, an input unit (e.g., including input circuitry) 220, an audio processing unit (e.g., including audio processing circuitry) 230, a display unit 240, a storage unit 250, and a control unit (e.g., including processing circuitry) 280.

The communication unit 210 may include various communication circuitry and can be configured to support a communication function of the electronic device 200. The communication unit 210 can be included when, for example, the electronic device 200 is fabricated to support the communication function. Accordingly, when the electronic device 200 does not support the communication function, the communication unit 210 can be omitted from the electronic device 200. According to various embodiments, the communication unit 210 can be implemented as a mobile communication module to support the communication function (e.g., a mobile communication function) of the electronic device 200. The communication unit 210 can establish a communication channel with a mobile communication system and support signal transmission and reception for the mobile communication function of the electronic device 200. For example, the communication unit 210 can establish at least one of a voice service channel, a video service channel, or a data service channel with the mobile communication system, and support transmission and reception of particular signals over the corresponding service channel. According to an embodiment, the communication unit 210 can support to receive or send contents managed through a contents management application 251 from or to outside.

The input unit 220 may include various input circuitry and can generate various input signals required to operate the electronic device 200. The input unit 220 can include various input circuitry, such as, for example, and without limitation, a keyboard, a keypad, and a key button, according to compatibility of the electronic device 200. According to an embodiment, the input unit 220 can generate an input for supporting the contents management application 251 in displaying and/or creating contents.

The audio processing unit 230 may include various audio processing circuitry and can output various audio data in the operations of the electronic device 200, audio data when an audio file stored in the storage unit 250 is played, and audio data received from the outside. The audio processing unit 230 can support an audio data collection function. For doing so, the audio processing unit 230 can include various circuitry, such as, for example, and without limitation, a speaker (SPK) and a microphone (MIC). According to an embodiment, the audio processing unit 230 can output various sound effects or guide sounds regarding the contents management application 251 under user control or control of the control unit 280. The sound effect or guide sound output from the audio processing unit 230 may be omitted according to user preference or a designer intention.

The display unit 240 can provide various screen interfaces required to operate the electronic device 200. The display unit 240 can be implemented using a touch screen by combining a display panel 241 and a touch panel 243. The display panel 241 can output images and texts corresponding to various screens, and can output at least one of the screen interfaces. The touch panel 243 can include a touch effective region which normally collects a touch event and a touch ineffective region which discards the collected touch event or does not collect a touch event, according to screen characteristics of the display panel 241. The touch panel 243 can send the touch event of the touch effective region to the control unit 280. According to an embodiment, the display unit 240 can provide various GUI elements based on the contents management application 241, through the display panel 241. The display unit 240 can generate various touch inputs or hovering inputs to support the contents management application 251.

The storage unit 250 (e.g., the memory 130 of FIG. 1) can store various basic OSs required to operate the electronic device 200, data or application programs corresponding to various user functions, or algorithms. According to an embodiment, the storage unit 250 can include the contents management application 251 (e.g., part of the application 147 FIG. 1) which executes the contents management function, applications 252 (e.g., part of the application 147 of FIG. 1) supporting the contents management function, and a contents set 253.

According to an embodiment, the contents management application 251 can include an instruction (e.g., program element) for displaying a contents list through the display unit 240. The contents management application 251 can include an instruction for selecting a contents list entry according to a user input.

According to an embodiment, the contents management application 251 can include an instruction for reading a content of the selected contents list entry. For example, the contents management application 251 can display the content of the contents list entry selected in the contents list. When detecting one or more related contents including a tag associated with the read content, the contents management application 251 can display an indicator. The indicator can be a GUI element for informing the user of the one or more related contents of the read content. The contents management application 251 can confirm selection of the indicator and display a list of the one or more related contents.

According to an embodiment, the contents management application 251 can include an instruction for creating a related content according to a user input.

According to an embodiment, the contents management application 251 can include an instruction for generating a tag from the read content. For example, the contents management application 251 can extract identification information (e.g., identification keyword) from at least part of the read content and generate the tag including it. The tag is an attribute representing the relationship between contents. For example, when a second content is created in relation to a first content, a tag including identification information of the first content can be automatically generated and the second content can include a tag relating to the first content. The contents management application 251 can include an instruction for adding the generated tag to the related content. The contents management application 251 can include an instruction for adding a contents list entry corresponding to the created related content, to the contents list.

The applications 252 (or application programs) supporting the contents management function can provide various contents processed by the contents management application 251. According to an embodiment, the applications 252 supporting the contents management function can include, for example and without limitation, one or more applications for conducting, for example, a home, a dialer, a short message service (SMS)/multimedia messaging system (MMS), an instant message (IM), a browser, a camera, an alarm, a contact, a voice dial, an email, a calendar, a media player, an album, a watch, health care (e.g., measure an exercise amount or blood sugar level), or environmental information provision (e.g., provide air pressure, humidity, or temperature information).

According to various embodiments, the applications 252 supporting the contents management function can include, for example, and without limitation, an application (hereafter, referred to as an information exchange application) for supporting information exchange between the electronic device 200 (e.g., the electronic device 101) and the external electronic device (e.g., the electronic device 102 or 104). The information exchange application can include, for example, a notification relay application for relaying specific information to the external device, or a device management application for managing the external electronic device. For example, the notification relay application can forward notification information generated from another application (e.g., the SMS/MMS application, the email application, the health care application, or the environmental information provision application) of the electronic device 200 to the external electronic device (e.g., the electronic device 102 or 104). Also, the notification relay application, for example, can receive and forward notification information from the external electronic device to the user. The device management application, for example, can manage (e.g., install, delete, or update) at least one function (e.g., turn-on/turn off of the external electronic device itself (or some components) or display brightness (or resolution) adjustment) of the external electronic device (e.g., the electronic device 102 or 104) communicating with the electronic device, an application operating in the external electronic device, or a service (e.g., call service or message service) provided from the external electronic device.

According to various embodiments, the applications 252 supporting the contents management function can include a designated application (e.g., a health care application of a mobile medical device) according to a property of the external electronic device (e.g., the electronic device 102 or 104). According to an embodiment, the application associated with the contents used by the contents management application 251 can include an application received from the external electronic device (e.g., the server 106 or the electronic device 102, 104). According to an embodiment, the application associated with the contents used by the contents management application 251 can include a preloaded application or a third party application which can be downloaded from the server. The names of the components according to the embodiment can vary according to the type of the OS.

The contents set 253 can include, for example, and without limitation, various contents managed by the contents management application 251. According to various embodiments, such contents can be provided from the contents management function supporting applications 252. According to an embodiment, the contents may be created using the contents management application 251.

The control unit 280 (e.g., the processor 120 of FIG. 1) may include various processing circuitry and can control various signal flows and information collection and outputs to support the contents management function of the contents management application 251. The control unit 280 can include components (a contents collector 281, a related contents curator 282, and a related contents creation supporter 283) of FIG. 3. The control unit 280 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to various embodiments, the electronic device 200 can further include various modules according to their type. For example, the electronic device 200 may further include a short-range communication module for short-range communication, an interface for sending and receiving data using the wired communication or the wireless communication, an Internet communication module for conducting the Internet function by communicating over the Internet, and a digital broadcasting module for receiving and playing a digital broadcast. Such components, which can be modified widely according to convergence of digital devices, are not illustrated herein, but the device can further include components equivalent to the above-stated components. Those skilled in the art can easily understand that the electronic device 200 may omit or replace particular components with other components according to the type.

The electronic device 200 can include mobile communication terminals operating based on communication protocols corresponding to various communication systems, information communication devices, multimedia devices, and their application devices, such as a PMP, a digital broadcasting player, a PDA, a music player (e.g., an MP3 player), a portable game terminal, a smart phone, a notebook, and a handheld PC, or the like, but is not limited thereto.

Figure 3:
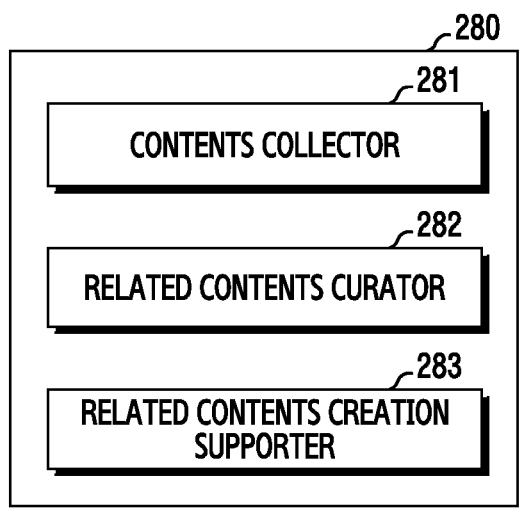
FIG. 3 is a diagram illustrating an example control unit according to an example embodiment of the present disclosure.

FIG. 3 is a diagram illustrating an example control unit 280 according to an example embodiment of the present disclosure.

Referring to FIG. 3, the control unit 280 can include the contents collector (e.g., including processing circuitry and/or program elements) 281, the related contents curator (e.g., including processing circuitry and/or program elements) 282, and the related contents creation supporter (e.g., including processing circuitry and/or program elements) 283.

The contents collector 281 may include various processing circuitry and/or program elements that can gather various contents using the contents set 253 stored in the storage unit 250 according to the instruction of the contents management application 251. The contents collector 281 can collect contents created using the applications 252 installed on the electronic device 200.

The related contents curator 282 may include various processing circuitry and/or program elements that can retrieve and display one or more various contents associated with any one content according to the instruction of the contents management application 251. According to an embodiment, the related contents curator 282 can extract identification information of the any one content, and retrieve and display a related content including the extracted identification information. The contents management application 251 can provide various curating rules, and the related contents curator 282 can retrieve and display the related contents based on the curating rule.

For example, the related contents curator 282 can retrieve one or more files associated with an email content and provide them as related contents information. When contents (e.g., email content, event, JIRA data, etc.) related to the email content include one or more files, the related contents curator 282 can provide the files as related contents information of the email content.

For example, the related contents curator 282 can retrieve one or more email contents associated with the email content, and provide them as related contents information. According to an embodiment, the related contents curator 282 can retrieve one or more thread email contents linked with a thread ID of the email content, and provide them as related contents information of the email content.

For example, the related contents curator 282 can retrieve one or more event contents associated with the email content, and provide them as related contents information. According to an embodiment, the related contents curator 282 can compare a subject of the email content with a subject of the event content, and provide the event content having the matching subject as the related contents information of the email content.

For example, the related contents curator 282 can retrieve one or more task contents associated with the email content, and provide them as related contents information. According to an embodiment, the related contents curator 282 can retrieve a task content including a tag of an email content subject in a description field, and provide it as the related contents information of the email content.

For example, the related contents curator 282 can retrieve one or more memo contents associated with the email content, and provide them as related contents information. According to an embodiment, the related contents curator 282 can retrieve the memo content including a tag of an email content subject in a body, and provide it as the related contents information of the email content.

For example, the related contents curator 282 can retrieve one or more contact contents associated with the email content, and provide them as related contents information. According to an embodiment, the related contents curator 282 can retrieve recipients which belong to a group relating to recipients of the email content but do not receive the email, and provide them as the related contents information of the email content.

For example, the related contents curator 282 can retrieve one or more third party application data associated with the email content, and provide them as related contents information. According to an embodiment, the related contents curator 282 can confirm a link associated with a JIRA issue in an email content body, and provide corresponding JIRA data as the related contents information of the email content. According to various embodiments, the related contents curator 282 can confirm a chatroom of the email recipients and provide it as the related contents information of the email content.

For example, the related contents curator 282 can retrieve one or more files associated with an event content, and provide them as related contents information. According to an embodiment, when the contents (e.g., email content, event, JIRA data, etc.) related to the email content include one or more files, the related contents curator 282 can provide the files as the related contents information of the event content.

For example, the related contents curator 282 can retrieve one or more email contents associated with the event content, and provide them as related contents information. According to an embodiment, the related contents curator 282 can compare a subject of the email content with a subject of the event content, and provide the event content having the matching subject as the related contents information of the event content.

For example, the related contents curator 282 can retrieve one or more event contents associated with the event content, and provide them as related contents information. According to an embodiment, the related contents curator 282 can compare a subject of the event content with a subject of other event content, and provide the other event content having the matching subject as the related contents information of the event content.

For example, the related contents curator 282 can retrieve one or more task contents associated with the event content, and provide them as related contents information. According to an embodiment, the related contents curator 282 can retrieve the task content including a tag including a subject and/or an event date/time of the event content in a description field, and provide it as the related contents information of the event content.

For example, the related contents curator 282 can retrieve one or more memo contents associated with the event content, and provide them as related contents information. According to an embodiment, the related contents curator 282 can retrieve the memo content including a tag including a subject and/or a date/time of the event content in a body, and provide it as the related contents information of the event content.

For example, the related contents curator 282 can retrieve one or more contact contents associated with the event content, and provide them as related contents information. According to an embodiment, the related contents curator 282 can retrieve recipients which belong to a group of event content recipients but do not receive the email, and provide them as the related contents information of the event content.

For example, the related contents curator 282 can retrieve one or more third party application data associated with the event content, and provide them as related contents information. According to an embodiment, the related contents curator 282 can confirm a chatroom of the event content recipients and provide it as the related contents information of the event content.

The related contents creation supporter 283 may include various processing circuitry and/or program elements that can execute an editor provided from the contents management application 251, create a content associated with any one content based on a user input in the editor execution, and store the content in the contents set 253 of the storage unit 250. According to an embodiment, the related contents creation supporter 283 can identify the type of the content according to the instruction of the contents management application 251, and extract identification from at least part of the content in a manner defined by the identified content type. For example, when creating a related content of an email content, the related contents creation supporter 283 can generate a tag based on a subject of the email content and add the tag to the identification information (e.g., tag) of the created related content.

The control unit 280 may include various processing circuitry that can further include an input supporter (not shown). The input supporter may include various processing circuitry and/or program elements that can obtain an input from the input unit 220, the touch panel 243, or the communication unit 210. The contents collector 281, the related contents curator 282, or the related contents creation supporter 283 can carry out the above-stated operation based on the input from the input supporter.

The control unit 280 can further include a display supporter (not shown). The display supporter may include various processing circuitry and/or program elements that can provide various GUIs for various operations of, the contents collector 281, the related contents curator 282, or the related contents creation supporter 283.

According to an embodiment, an electronic device can include a memory for storing a plurality of contents, a processor electrically coupled with the memory. The memory can store instructions which, when executed, cause the processor to generate a contents list, based on a user input, to detect selection of a contents list entry in the contents list and to create one or more contents related to a content of the selected contents list entry, when creating the one or more related contents, to generate a tag based on at least part of the content corresponding to the selected contents list entry, to add the tag to the one or more related contents, and to add a contents list entry of the one or more related contents comprising the tag, to the contents list.

The instructions can cause the processor to generate a tag comprising at least one keyword of the content of the selected contents list entry.

The instructions can cause the processor to display a list of various content types, to select a content type in the list, to execute an editor based on the selected content type, and to create the related content according to a user input based on the executed editor.

The instructions can cause the processor to display the content of the selected contents list entry.

The instructions can cause the processor, when displaying the content of the selected contents list entry, to display an indicator indicating presence of the one or more related contents.

The instructions can cause the processor to display the content of the selected contents list entry in a first display region of a screen of the electronic device, and to display the indicator in a second display region which is separated from the first display region.

The instructions can cause the processor to detect selection of the indicator and to display a list of contents list entries of the one or more related contents.

The instructions can cause the processor to, when one entry is selected in the displayed list, to display the selected entry through a corresponding viewer.

The instructions can cause the processor, when generating the contents list, to collect contents created using a plurality of applications installed on the electronic device.

The instructions can cause the processor to send the created one or more contents to outside.

Figure 4:
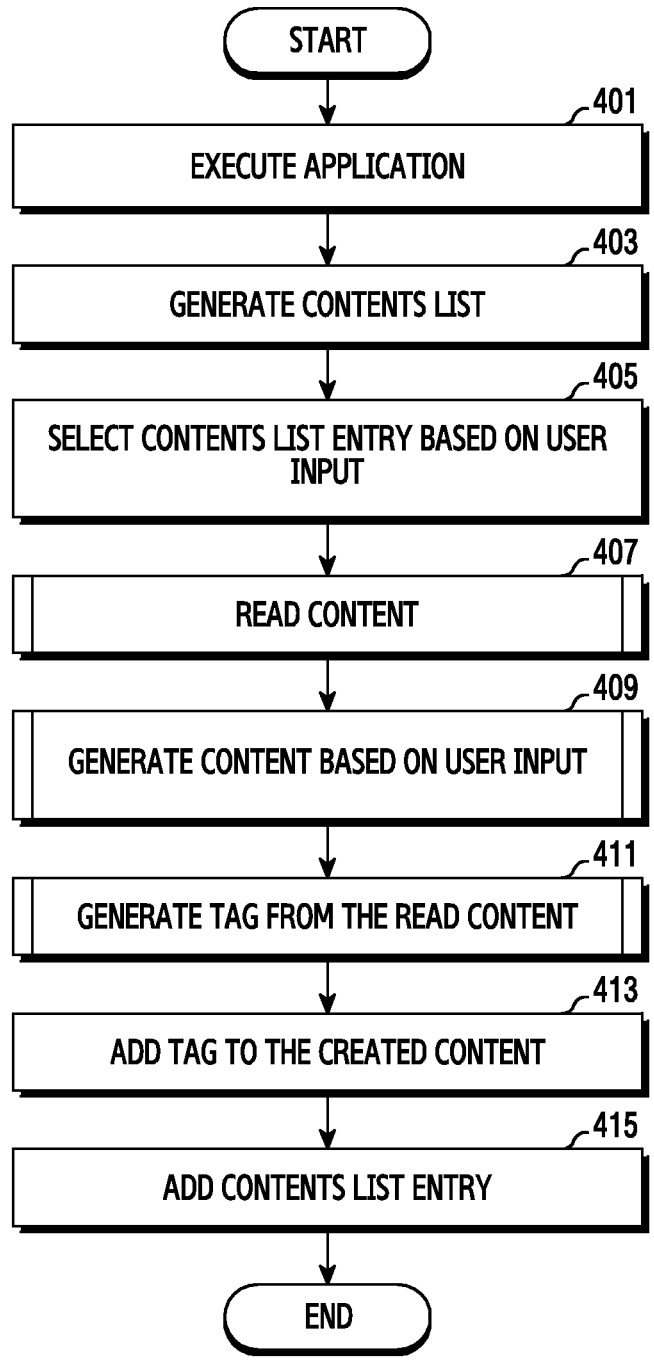
FIG. 4 is a flowchart illustrating an example method for providing a contents management function according to an example embodiment of the present disclosure.

FIG. 4 is a flowchart illustrating an example method for providing a contents management function according to an example embodiment of the present disclosure. FIGS. 5A, 5B, 5C, 5D and 5E are diagrams illustrating an example contents management function of FIG. 4 according to an example embodiment of the present disclosure.

Referring to FIG. 4, the control unit (e.g., 280 of FIG. 2) may execute a contents management application (e.g., 251 of FIG. 2) in operation 401. For example, referring to FIG. 5A, the electronic device 200 may display a plurality of icons 511 on a screen 501. The icons 511 may represent applications stored in an electronic device 500. According to various embodiments, contents managed by the contents management application 251 may be associated with other various applications (e.g., contacts, email, calendar, etc.) stored in the electronic device 500. When a user input selects a corresponding icon 512 from the icons 511, the control unit 280 may execute the contents management application 251. The control unit 280 may perform various operations according to instructions supported by the contents management application 251.

In operation 403, the control unit 280 may generate a contents list. According to an embodiment, the control unit 280 may generate the contents list with various contents (e.g., the contents set 253 of FIG. 2). According to various embodiments, the control unit 280 may collect contents associate with applications 252 of FIG. 2 supporting the contents management function to conduct various functions, and generate the contents list by analyzing the contents.

Although not depicted, the control unit 280 may display the contents list on a display unit (e.g., 240 of FIG. 2). According to an embodiment, the control unit 280 may generate a screen for displaying the contents list (hereafter, referred to as a contents list screen). For example, referring to FIG. 5B, a contents list screen 502 may include a plurality of display regions. According to an embodiment, the contents list screen 502 may include a first display region 5021 for displaying a category list and a second display region 5022 for displaying the contents list.

The category list may include a plurality of category list entries which divide the contents associated with the applications based on the content type, and display GUI elements (e.g., icons or tap icons) representing the category list entries in the first display region 5021. For example, the GUI elements may include an icon 521 representing the category list entry of email contents, an icon 522 representing the category list entry of calendar contents, an icon 523 representing the category list entry of memo contents, and an icon 524 representing the category list entry of contacts.

According to various embodiments, the contents management application 251 may provide an intelligent messaging function. The intelligent messaging function may summarize and notify information about important messages, schedules, and tasks based on user preference (e.g., important sender, important keyword, etc.) to the user. According to the intelligent messaging function, the control unit 280 may collect contents associated with the various applications, analyze the contents, and create various contents (hereafter, referred to as notification contents) to notify to the user. For example, when an email requesting to attend a meeting is received from an important sender, the intelligent messaging function may create notification contents by extracting information (e.g., a meeting time, a venue, participants, etc.) from at least part of the email, and display the notification contents using various GUI elements. For example, referring to FIG. 5B, the notification contents may be displayed as a GUI element (hereafter, referred to as a card GUI element) 5251 which resembles a rectangular card.

According to various embodiments, the intelligent messaging function may be prompted to the user in various forms so as to take a proper action for context (e.g., context based on the time, the place, etc.). For example, referring to FIG. 5B, the card GUI element including the meeting schedule may be created from a received email and displayed. The card GUI element may display an attend button 5253 and an absent button 5254. For example, when the absent button 5254 is selected, the control unit 280 may send an absent message to an originating contact of the received email or a contact of a participant.

According to an embodiment, the category list may include a category list entry of the notification contents according to the intelligent messaging function, and the first display region 5021 may display its icon 525. The first display region 5021 may be positioned below the contents list screen 502, and a plurality of icons 521, 522, 523, 524 and 525 may be arranged from left to right (horizontally) of the contents list screen 502.

Figure 5A:
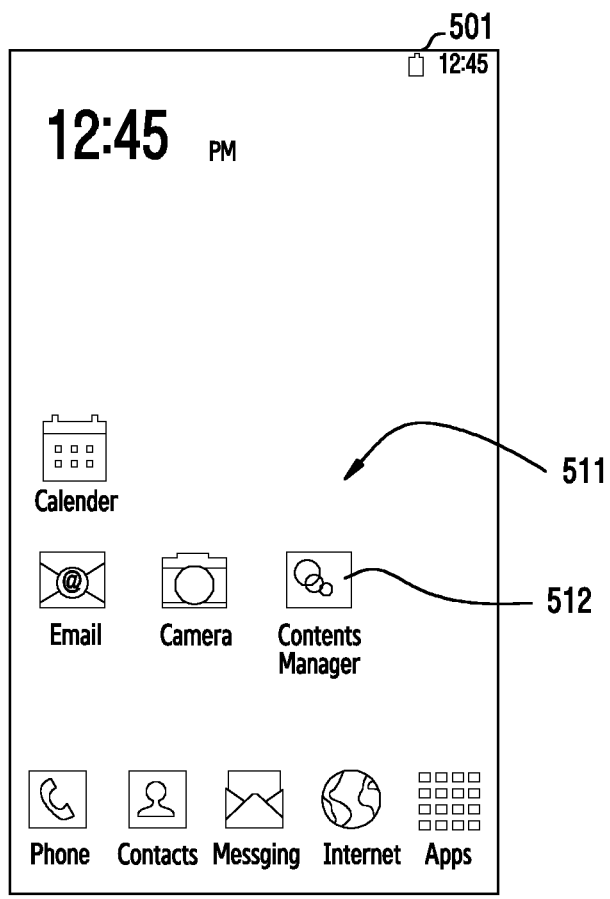
FIGS. 5A, 5B, 5C, 5D and 5E are diagrams illustrating an example contents management function of FIG. 4 according to an example embodiment of the present disclosure.
Figure 5B:
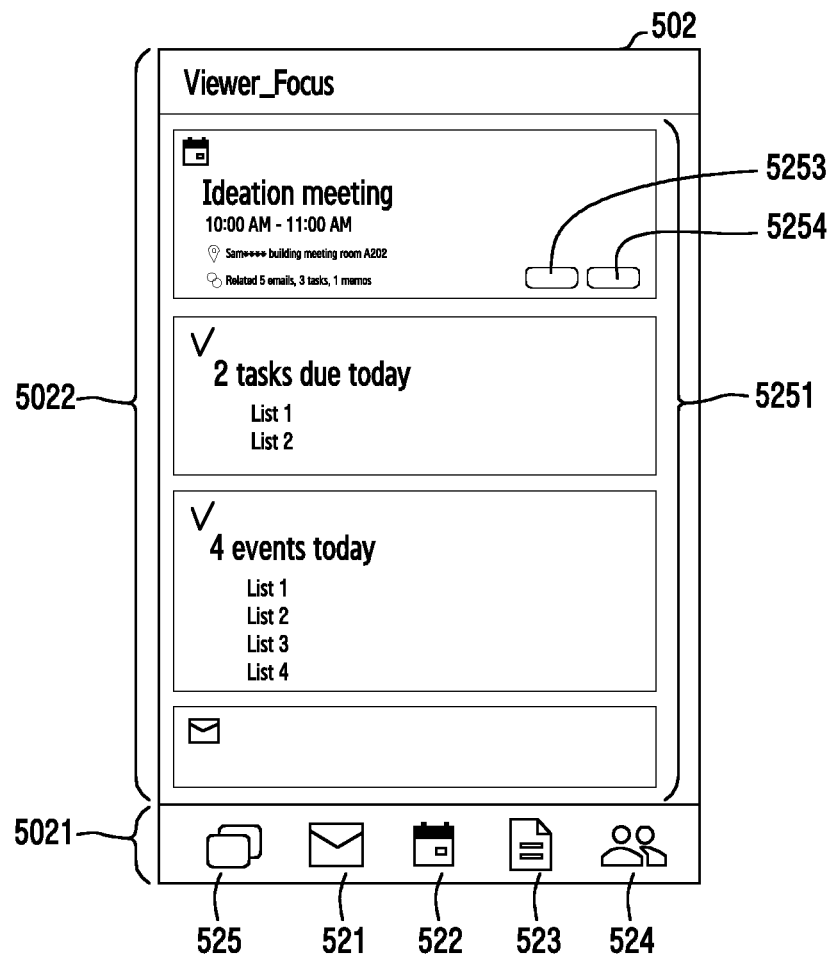
Figure 5C:
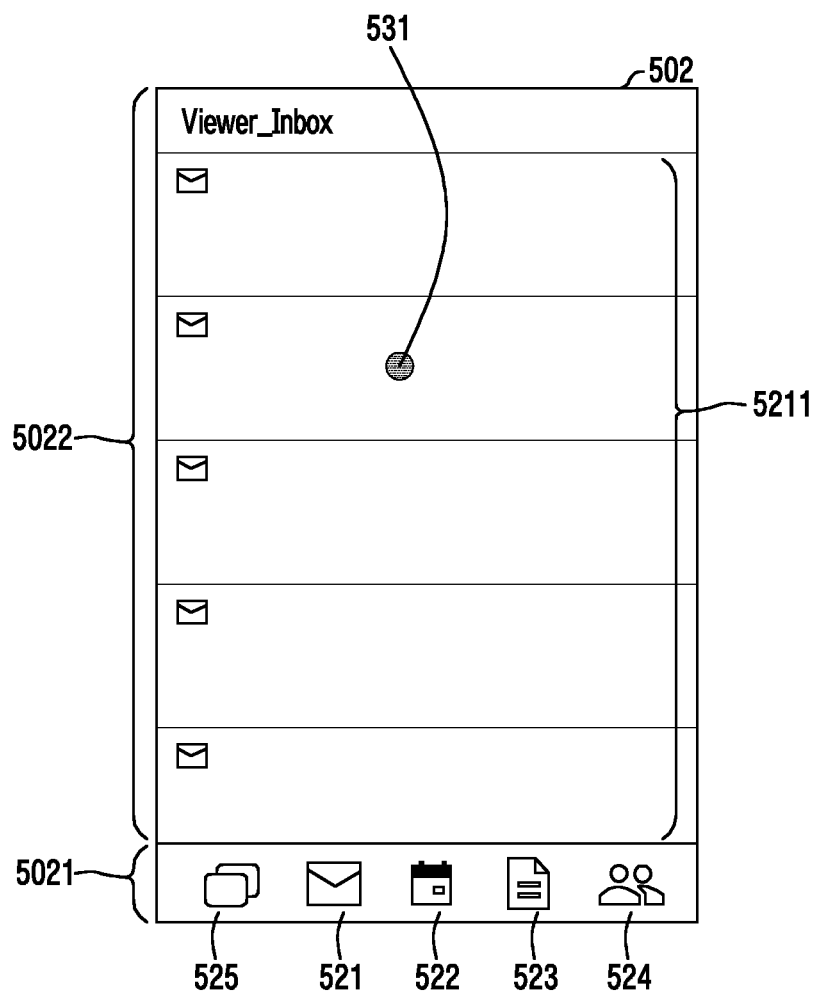
Figure 5D:
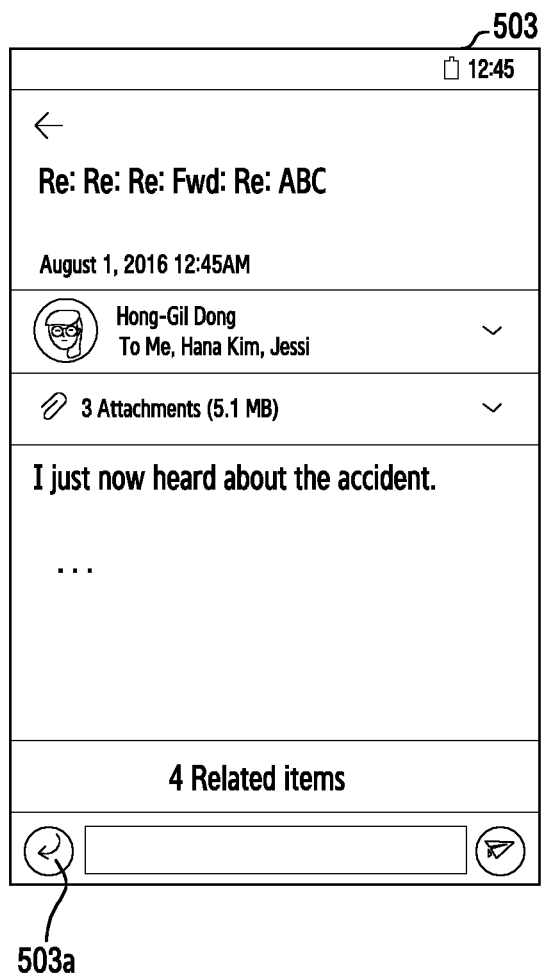
Figure 5E:
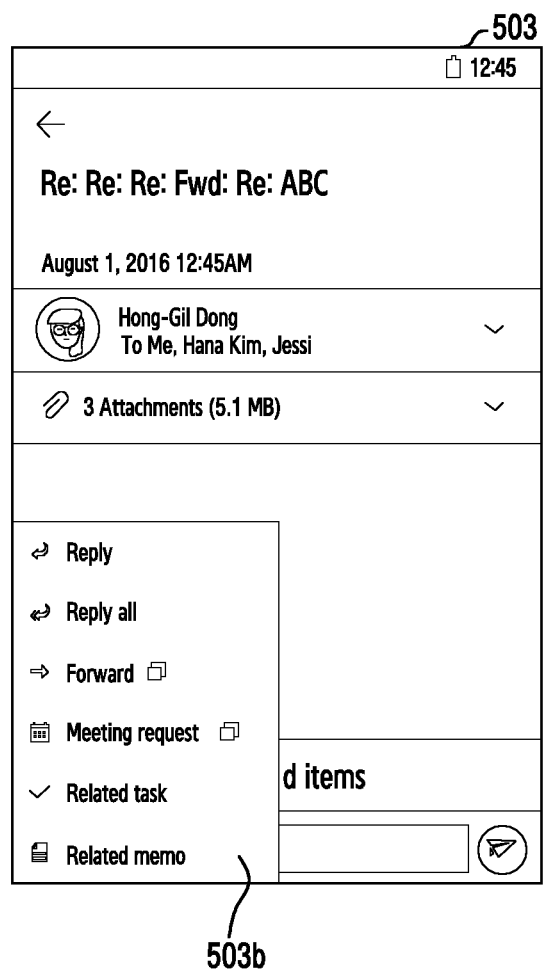

The second display region 5022 may display the contents list of the category list entry corresponding to the icon selected by the user input from the icons 521 through 525 of the first display region 5021. Referring to FIG. 5C, when the user input selects the icon 521 representing the category list entry associated with the email contents, the control unit 280 may display an email contents list (e.g., a received email contents list) 5211 in the second display region 5022. The email contents list entries may be displayed as card GUI elements or other various GUI elements. According to various embodiments, the contents list entries may be arranged from top to bottom (vertically) of the contents list screen 502. Likewise, when the user input selects the other icon 522, 523, 524 or 525, the control unit 280 may display a corresponding contents list in the second display region 5022.

According to an embodiment, the control unit 280 may set the second display region 5022 as a scroll region. For example, referring to FIG. 5C, for other email contents list entries displayable using the scrolling, the control unit 280 may set the second display region 5022 as the scroll region. The control unit 280 may scroll the email contents list of the second display region 502 according to a touch input (e.g., touch flicking) 531 on the second display region 5022. According to various embodiments, the control unit 280 may set the first display region 5021 as the scroll region.

When displaying the contents list in the second display region 5022, the control unit 280 may extract information from at least part of each content and generate a contents list entry based on the information. The control unit 280 may display the generated contents list entry using various GUI elements.

According to various embodiments, the first display region 5021 and the second display region 5022 are substantially rectangular, and the second display region 5022 may be disposed in a lower area of the contents list screen 502.

In operation 405, the control unit 280 may select the contents list entry based on a user input. For example, referring to FIG. 5C, while displaying an email contents list 5211 in the second display region 5022, the control unit 280 may detect a touch input (e.g., a single tap or a short touch) 531 in the second display region 5022 and select an email contents list entry corresponding to the touch input.

In operation 407, the control unit 280 may read a content of the selected contents list entry. According to an embodiment, the control unit 280 may load from the storage unit 250 and display the content corresponding to the selected contents list entry. For example, when the touch input 531 selects the email contents list entry on the email contents list screen 502 of FIG. 5C, the control unit 280 may switch to a content reading screen 503 of FIG. 5D and display contents corresponding to the selected email contents list entry on the content reading screen 503. The content reading shall be explained by referring to FIG. 6.

In operation 409, the control unit 280 may create or generate a related content based on a user input. For example, referring to FIGS. 5D and 5E, the control unit 280 may display an icon 503a for creating the related content on the content reading screen 503. When the icon 503a is selected by a touch input (e.g., a single tap or a short touch), the control unit 280 may display a list 503b of various content types on the content reading screen 503. When a touch input selects the content type in the list 503b, the control unit 280 may execute an editor for creating the content of the selected content type. Based on a user input based on the executed editor, the control unit 280 may create a related content of the read content. For example, when a received email content is read and a user input triggers a function (or action) for sending a replay email, the control unit 280 may execute the editor for creating an email content, create a related email content of the read email content received according to a user input based on the executed editor, and send the email content to outside. For example, when a received email content is read, the control unit 280 may execute the editor for creating a memo content and create a related memo content of the received email content according to a user input based on the executed editor. The creation of the related content shall be elucidated by referring to FIG. 8.

In operation 411, the control unit 280 may generate a tag from the read content. According to an embodiment, when creating the related content in operation 409, the control unit 280 may generate the tag. According to various embodiments, the control unit 280 may extract identification information from at least part of the read content and generate the tag including the identification information. The tag is an attribute representing the association between contents. For example, when a second content is created in relation to a first content, a tag including identification information of the first content may be automatically generated and the second content may include the tag relating to the first content. The identification information of the first content may vary according to the type of the first content. For example, when the first content is an email content, the identification information may include a subject, a name, a contact (e.g., a sender or a recipient), and so on. The tag generation shall be described in greater detail below with reference to FIG. 10.

In operation 413, the control unit 280 may add the generated tag to the related content. The related content may have the tag including the identification information representing the content of the read content.

In operation 415, the control unit 280 may add the contents list entry corresponding to the created related content, to the contents list.

Figure 6:
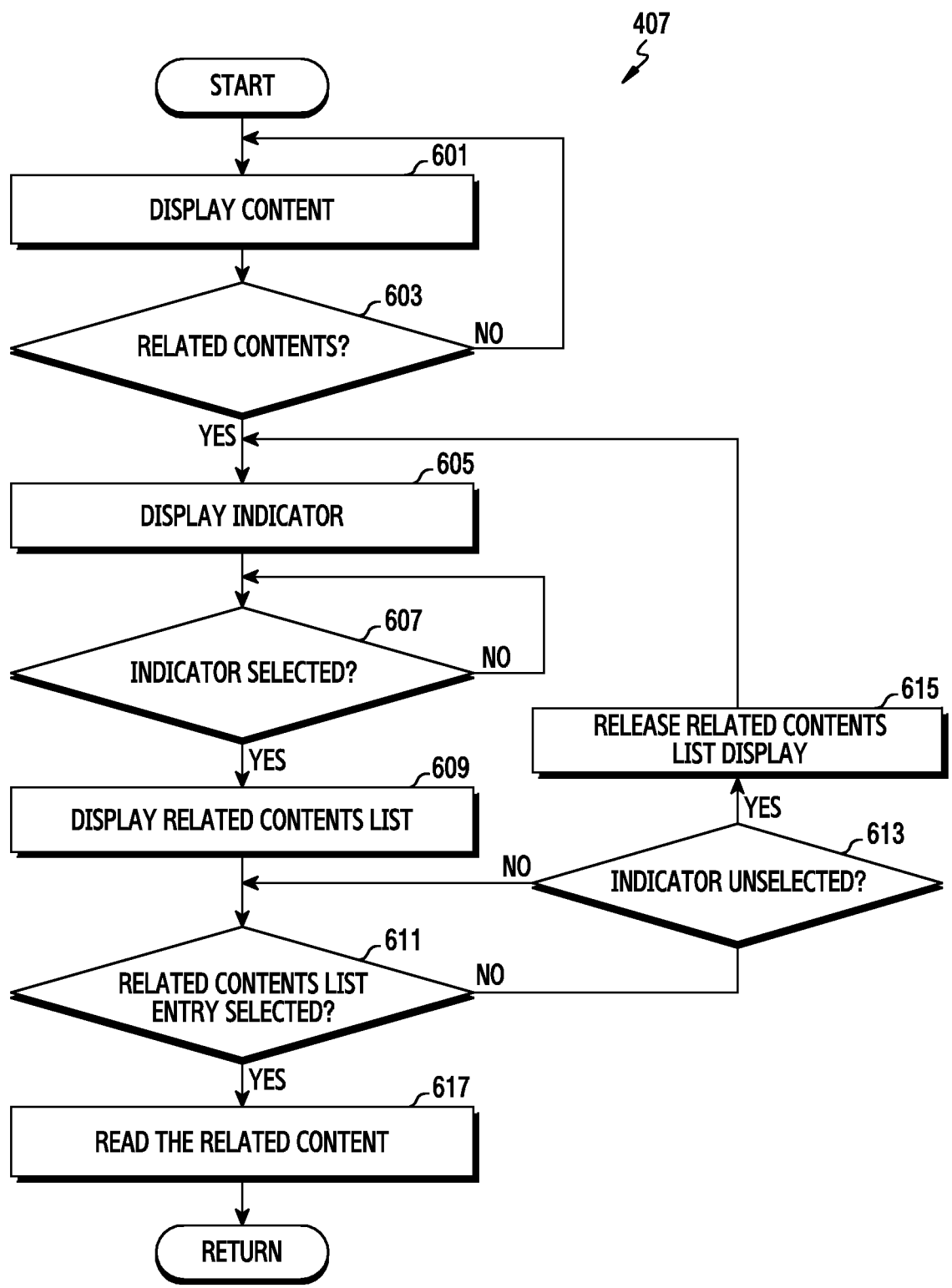
FIG. 6 is a flowchart illustrating an example of content reading of FIG. 4 according to an example embodiment of the present disclosure.

FIG. 6 is a flowchart illustrating example content reading of FIG. 4 according to an example embodiment of the present disclosure. FIGS. 7A, 7B, 7C, 7D and 7E are diagrams illustrating example operations of FIG. 6 according to an example embodiment of the present disclosure.

Referring to FIG. 6, in operation 601, the control unit (e.g., 280 of FIG. 2) may display the content of the selected contents list entry of operation 405 of FIG. 4. According to an embodiment, the control unit 280 may display the content on a content reading screen corresponding to the content of the selected contents list entry. For example, when an email contents list entry is selected from the email contents list, the control unit 280 may display an email content corresponding to the selected email contents list entry on an email content reading screen 702 of FIG. 7B. For example, the email content reading screen 702 may include a region 713 displaying a subject of the email content, a region 714 displaying time information (e.g., an email reception date) of the email content, a region 715 displaying a sender or a recipient of the email content, and a region 716 displaying an email content body. According to various embodiments, the content reading screen may vary according to the content type of the read content.

Figure 7A:
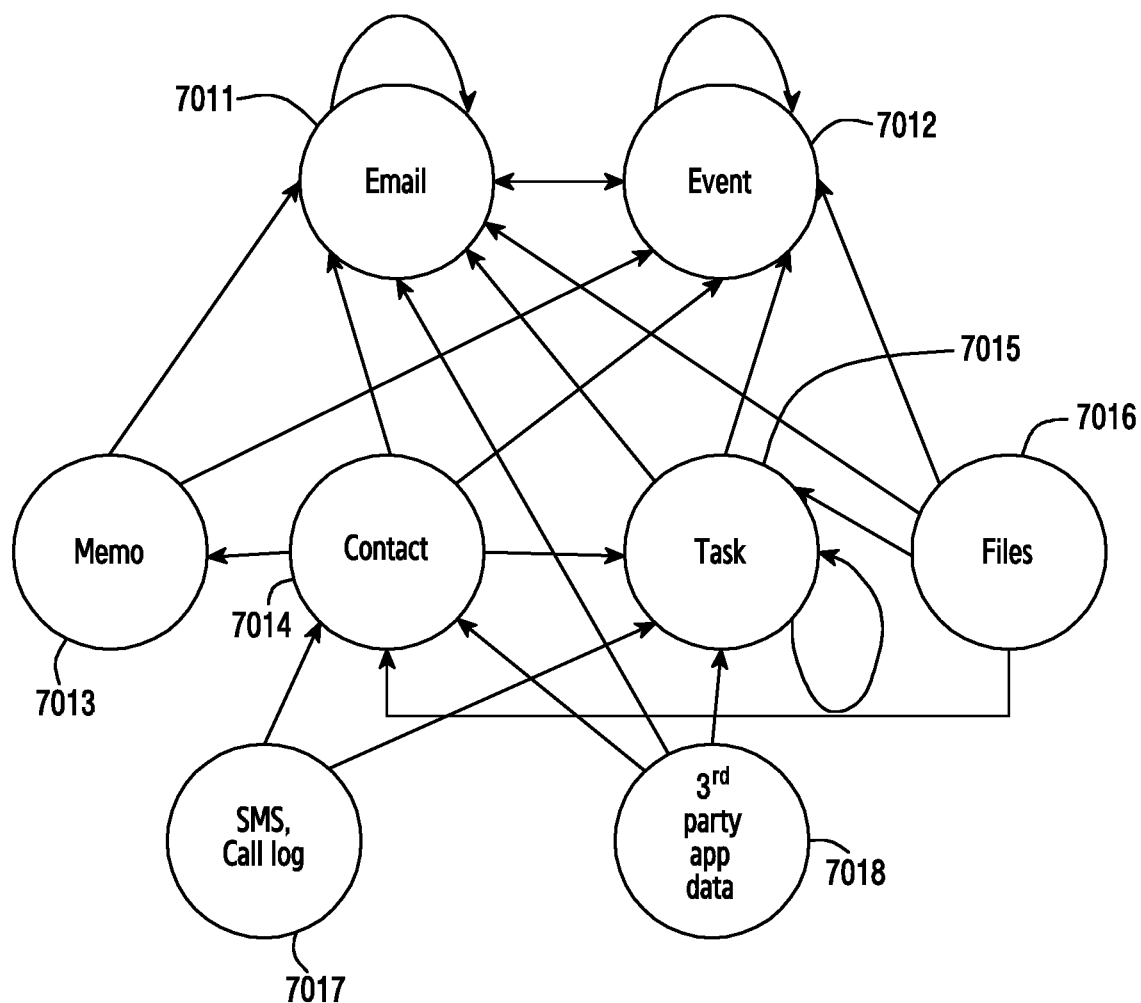
FIGS. 7A, 7B, 7C, 7D and 7E are diagrams illustrating example operations of FIG. 6 according to an example embodiment of the present disclosure.

In operation 603, the control unit 280 may determine whether there are one or more related contents of the read content. According to an embodiment, the control unit 280 may extract identification information of the read content and search the contents set for one or more related contents having the tag including the identification information. Upon detecting one or more related contents, the control unit 280 may proceed to operation 605. For example, associations between various contents are illustrated in FIG. 7A. According to an embodiment, the various contents may include an email content 7011, an event content 7012, a memo content 7013, a contact content 7014, a task content 7015, files (e.g., attachments, voice recording, cloud files, etc.) 7016, an SMS/call log content 7017, and third party application data (e.g., web link, JIRA data, IM message, SNS data, (e.g., LinkedIn), chatroom, etc.) 7018. The various applications 252 supporting the contents management function of FIG. 2 may provide the various contents of FIG. 7A. The contents management function 251 may define the association between various contents.

Figure 7B:
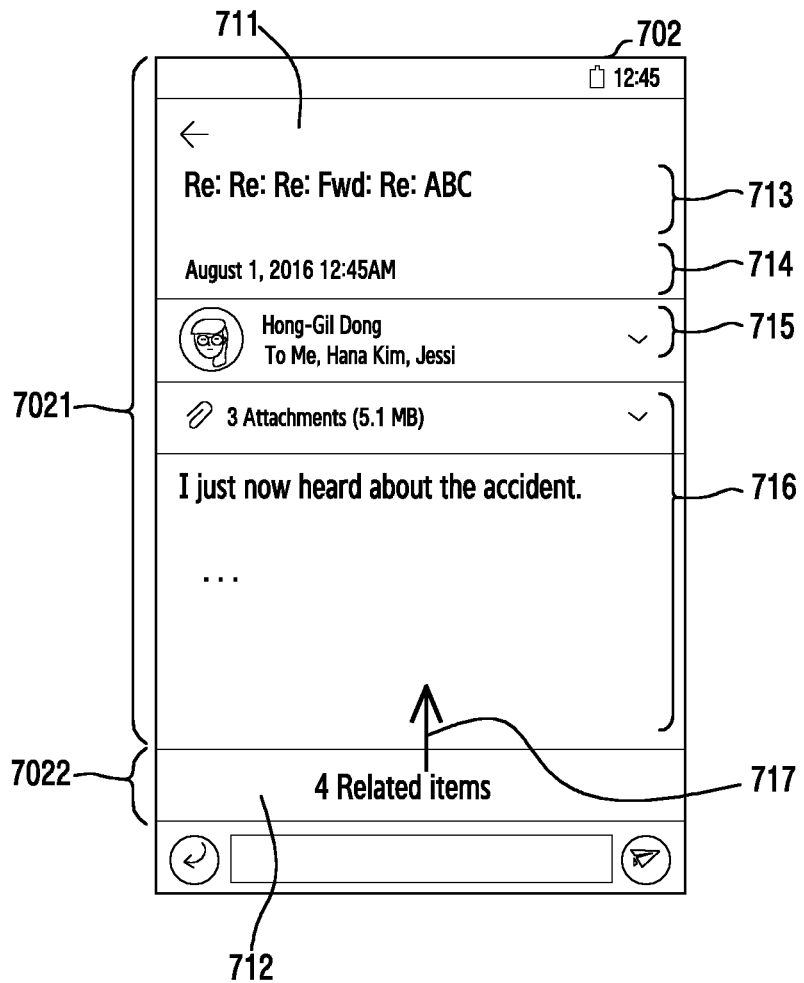

In operation 605, the control unit 280 may display an indicator. For example, FIG. 7B depicts the email content reading screen 702 displaying a read email content 711. The indicator 712 may be a GUI element notifying the user of one or more related contents of the read email content 711. The indicator 712 may be displayed as various GUI elements (e.g., a bar, an icon, etc.). For example, the indicator 712 may vary in shape and position according to the user preference. According to an embodiment, the email content reading screen 702 may include a first display region 7021 and a second display region 7022, the read email content 711 may be displayed in the first display region 7021, and the indicator 712 may be displayed in the second display region 7022. The first display region 7021 and the second display region 7022 may be substantially rectangular, separated from each other, and arranged vertically. According to various embodiments, the second display region 7022 may be smaller than the first display region 7021 in size and disposed substantially below the content reading screen 702.

Figure 7C:
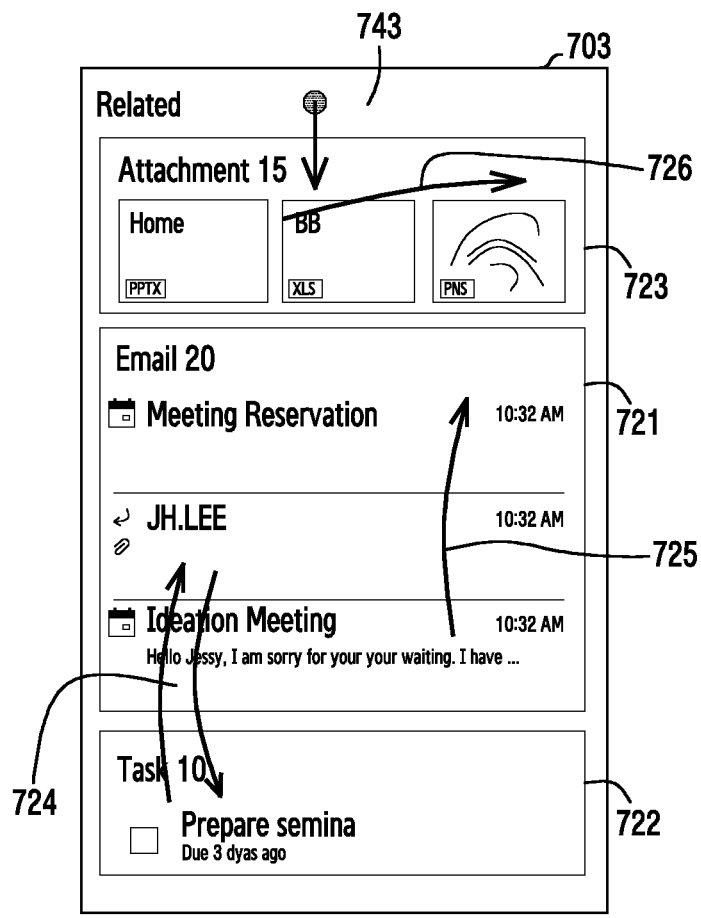

The control unit 280 may confirm and display the number of the one or more related contents on the indicator 712. When the first display region 7021 shows four contents related to the read email content 711 as shown in FIG. 7C, the control unit 280 may display a text "4 Related items" on the indicator 712.

In FIG. 7B, the control unit 280 may set the first display region 7021 as a scroll region, and scroll the content of the first display region 7021 according to a touch input (e.g., touch flicking) in the first display region 7021.

In operation 607, the control unit 280 may determine whether the indicator is selected. On the email content reading screen 702 of FIG. 7B, the control unit 280 detect the selection of the indicator 712 based on various user inputs. For example, when a single tape or a short touch touches the region of the indicator 712, the control unit 280 may determine the selection of the indicator 712. For example, when the region of the indicator 712 is touched and a touch input 717 drags the touch from the second display region 7022 toward the first display region 7021, the control unit 280 may determine the selection of the indicator 712.

Upon confirming the selection of the indicator 712, the control unit 280 may go to operation 609. In operation 609, the control unit 280 may display a list of one or more related contents. FIG. 7C depicts a related contents list screen 703 provided after the indicator 712 is selected on the email content reading screen 702 of FIG. 7B. Referring to FIG. 7C, the control unit 280 may switch from the email content reading screen 702 of FIG. 7B to the related contents list screen 703, and display the related contents list. As displaying the related contents list, the control unit 280 may extract information (e.g., content type) from at least part of each related content and generate a contents list entry based on the information.

The control unit 280 may display contents list entries using various GUI elements. According to an embodiment, the related contents list entry may be displayed as the above-stated card GUI element in FIG. 7C.

According to an embodiment, the control unit 280 may classify and display the related contents list entries based on the content type. For example, referring to FIG. 7C, the control unit 280 may display a card GUI element 721 representing one or more entries corresponding to the email content, and display a card GUI element 722 representing one or more entries corresponding to a task content. According to various embodiments, the control unit 280 may confirm attachment files in the one or more related contents and provide their card GUI element 723.

According to various embodiments, in FIG. 7C, the control unit 280 may set the display region of the related contents list screen 703 as a scroll region. For example, for other card GUI elements displayed through scrolling, the control unit 280 may set the display region of the related contents list screen 703 as the scroll region. According to an embodiment, when a touch input 724 (e.g., touch flicking) touches one card GUI element region and drags out of the region, the control unit 280 may scroll the card GUI elements.

For example, for other entries displayed through scrolling in the card GUI elements 721 and 723, the control unit 280 may set the display region of the card GUI elements 721 and 723 as the scroll region. When a touch input 725 touches a point in the card GUI element region 721 and drags to another point substantially vertically (e.g., from bottom to top or vice versa on the screen), the control unit 280 may scroll the entries of the card GUI element 721. When a touch input 726 touches a point in the card GUI element region 723 and drags to another point substantially horizontally (e.g., between the left and the right of the screen), the control unit 280 may scroll the entries of the card GUI element 723.

Figure 7D:
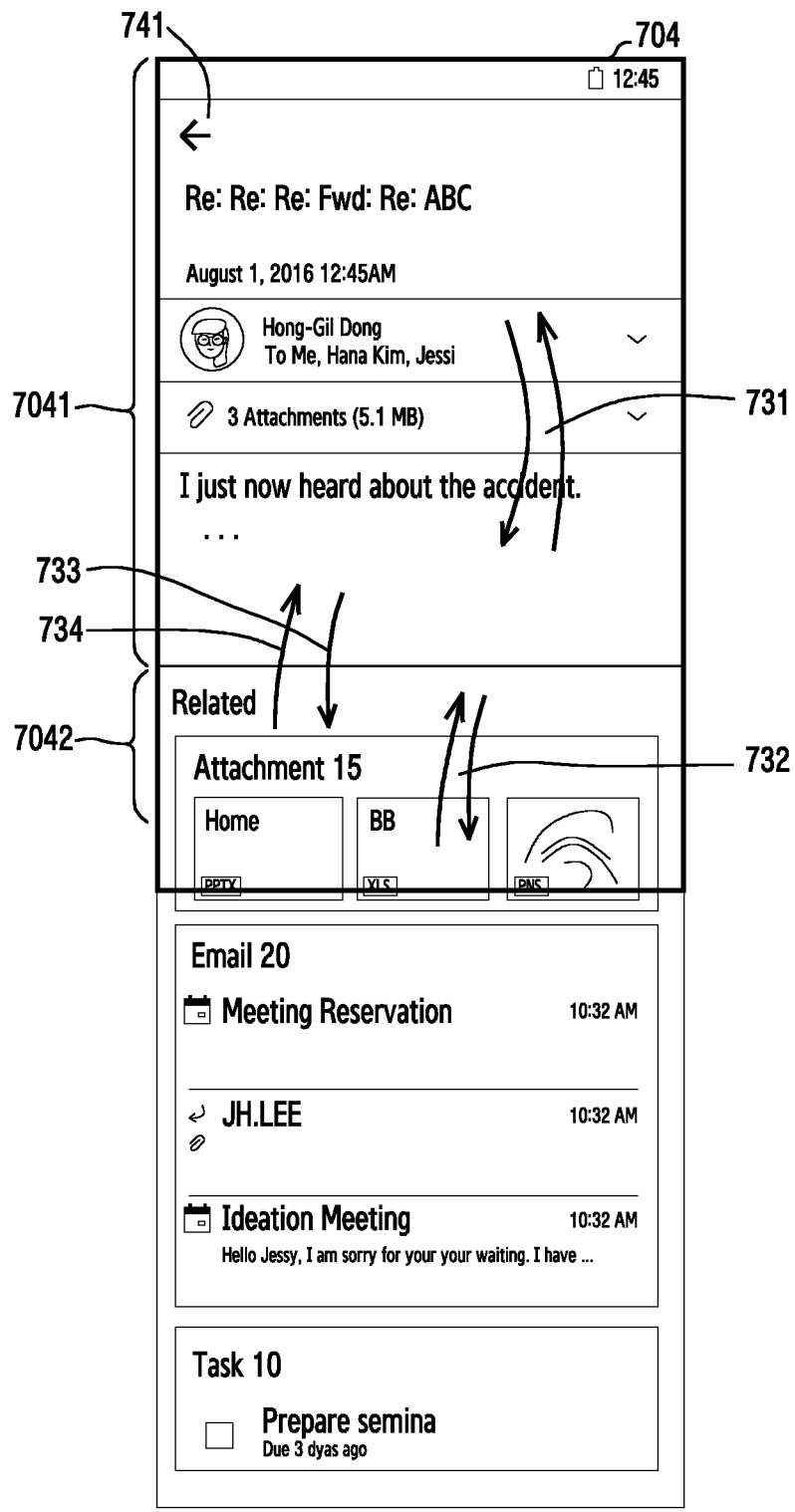
Figure 7E:
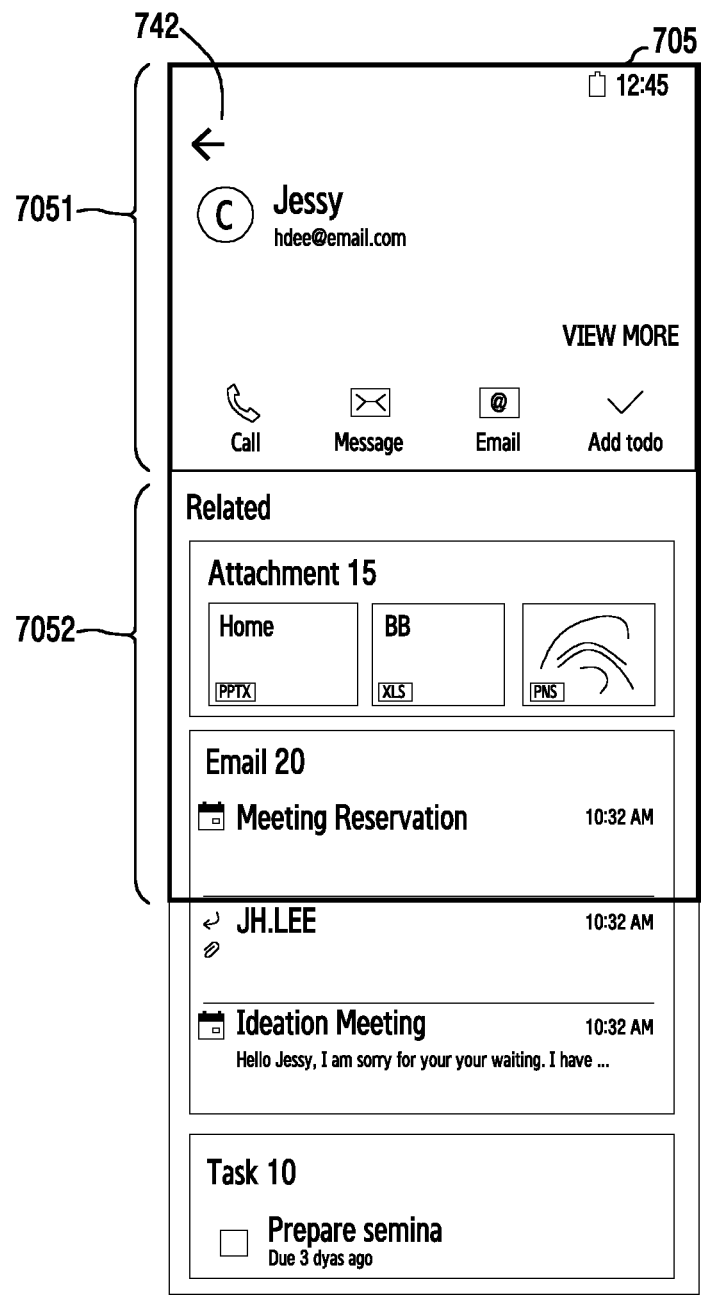

According to various embodiments, when displaying the related contents list, the control unit 280 may provide the related contents list on the content reading screen 702, without switching to the related contents list screen 703. For example, FIG. 7D depicts an event contents reading screen 704 after an indicator (e.g., the indicator 712 of FIG. 7B) is selected, and the event contents reading screen 704 additionally displays a related contents list. When the indicator (e.g., the indicator 712 of FIG. 7B) is selected, the control unit 280 may display the related contents list in a second display region 7042 (corresponding to the display region 7022 of FIG. 7B) and set a first display region 7041 (corresponding to the display region 7021 of FIG. 7B) and the second display region 7042 to be scrolled in FIG. 7D. According to an embodiment, when a touch input 731 touches a point and substantially vertically drags to another point in the first display region 7041, the control unit 280 may vertically scroll the content reading screen 704. When a touch input 732 touches a point and substantially vertically drags to another point in the second display region 7042, the control unit 280 may vertically scroll the content reading screen 704. When a touch input 733 touches a point in the first display region 7041 and substantially vertically drags to another point in the second display region 7042, the control unit 280 may scroll down the content reading screen 704. When a touch input 734 touches a point in the second display region 7042 and substantially vertically drags to another point in the first display region 7041, the control unit 280 may scroll up the content reading screen 704. For example, when the content reading screen 704 is scrolled up, the first display region 7041 may reduce and the second display region 7042 may expand in size. FIG. 7E depicts a related contents list additionally provided on a contact content reading screen 705 after an indicator (e.g., corresponding to the indicator 712 of FIG. 7B) is selected. Like FIG. 7D, the contact content reading screen 705 may display a read contact content in a first display region 7051, display a relate contents list having a tag associated with the read contact content in a second display region 7052, and support the screen scrolling as mentioned above.

When the indicator 712 of FIG. 7B is selected, the control unit 280 may release the displaying of the indicator 712 and display a separate GUI element indicating that the related contents list is being displayed.

For one or more related contents of the read content, the control unit 280 may display a list of the one or more related contents in operation 609, without operations 605 and 607. In this case, operations 613 and 615 shall be omitted. When one of the related contents list is not selected based on a user input in operation 611, the control unit 280 may return to operation 609.

Operations 605, 607, 613, and 615 for the indicator 712 of FIG. 7B may be selectively performed according to the user preference.

According to various embodiments, operations 605, 607, 613, and 615 for the indicator 712 of FIG. 7B may be selectively conducted according to the type of the contents displayed in operation 601 or context (or condition) of a viewer for reading or displaying the displayed content. For example, while displaying the event content in operation 601, the control unit 280 may immediately provide the list of one or more related contents in operation 609 without operations 605, 607, 613, and 615 for the indicator. The list of the one or more related contents may be displayed as shown in FIG. 7D or 7E.

When the user input selects one in the related contents list, the control unit 280 may detect the selection in operation 611 and proceed to operation 617. For example, while displaying the related contents list on the related contents list screen 703 of FIG. 7C, the control unit 280 may detect a touch input (e.g., a single tape or a short touch) on the related contents list screen 703 and select the related contents list entry corresponding to the touch input.

In operation 617, the control unit 280 may read a content of the selected related contents list entry. As reading the content of the selected related contents list entry, the control unit 280 may repeat the operations of FIG. 6.

When the user input does not selects one in the related contents list in operation 611, the control unit 280 may go to operation 613. In operation 613, the control unit 280 may determine whether the indicator 712 of FIG. 7B is unselected. For example, as displaying the related contents list in FIG. 7D or FIG. 7E, the control unit 280 may display a button 741 or 742 for releasing the display of the related contents list. When a region of the button 741 or 742 is touched, the control unit 280 may determine that the indicator 712 is unselected. For example, when an upper region 743 of the related contents list screen 703 is touched and the touch is dragged downward in FIG. 7C, the control unit 280 may determine that the indicator 712 is unselected. Next, the control unit 280 may go to operation 615. When the selection of the indicator 712 is maintained, the control unit 280 may go to operation 611.

The control unit 280 may release the display of the related contents list in operation 615 and go to operation 605. For example, the control unit 280 may switch from the related contents list screen 703 of FIG. 7C to the content reading screen 702 of FIG. 7B.

Figure 8:
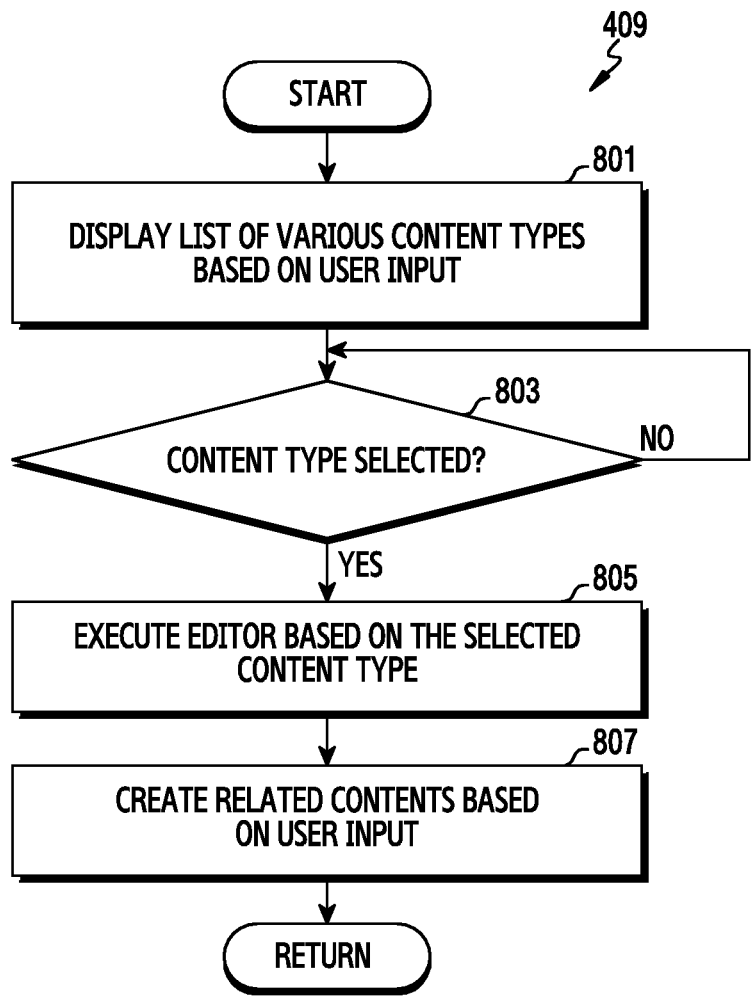
FIG. 8 is a flowchart illustrating an example of related contents creation of FIG. 4 based on a user input according to an example embodiment of the present disclosure.

FIG. 8 is a flowchart illustrating example related contents creation of FIG. 4 (e.g., operation 409) based on a user input according to an example embodiment of the present disclosure. FIGS. 9A, 9B, 9C, 9D and 9E illustrate example operations of FIG. 8 according to an example embodiment of the present disclosure.

Referring to FIG. 8, in operation 801, the control unit (e.g., 280 of FIG. 2) may display a list of various content types based on a user input. For example, in FIG. 9A, when one email contents list entry is selected in an email contents list (e.g., the screen 502 of FIG. 5C), an email content reading screen 902 displays an email content corresponding to the selected email contents list entry. As stated above, the email content reading screen 902 may include a first display region 9021 and a second display region 9022, the read email content 911 may be displayed in the first display region 9021, and an indicator 912 (e.g., the indicator 712 of FIG. 7B) may be displayed in the second display region 9022. According to an embodiment, the control unit 280 may provide a third display region 9023 on the email content reading screen 902. The third display region 9023 may include a first icon 913, an input display region 914, and a second icon 915. The first icon 913, the input display region 914, and the second icon 915 may be arranged horizontally, and the second display region 9022 may be interposed between the first display region 9021 and the third display region 9023. According to the content reading method of FIG. 6, when reading the content of the selected contents list entry of the contents list, the control unit 280 may provide the first icon 913, the input display region 914, and the second icon 915.

Figure 9A:
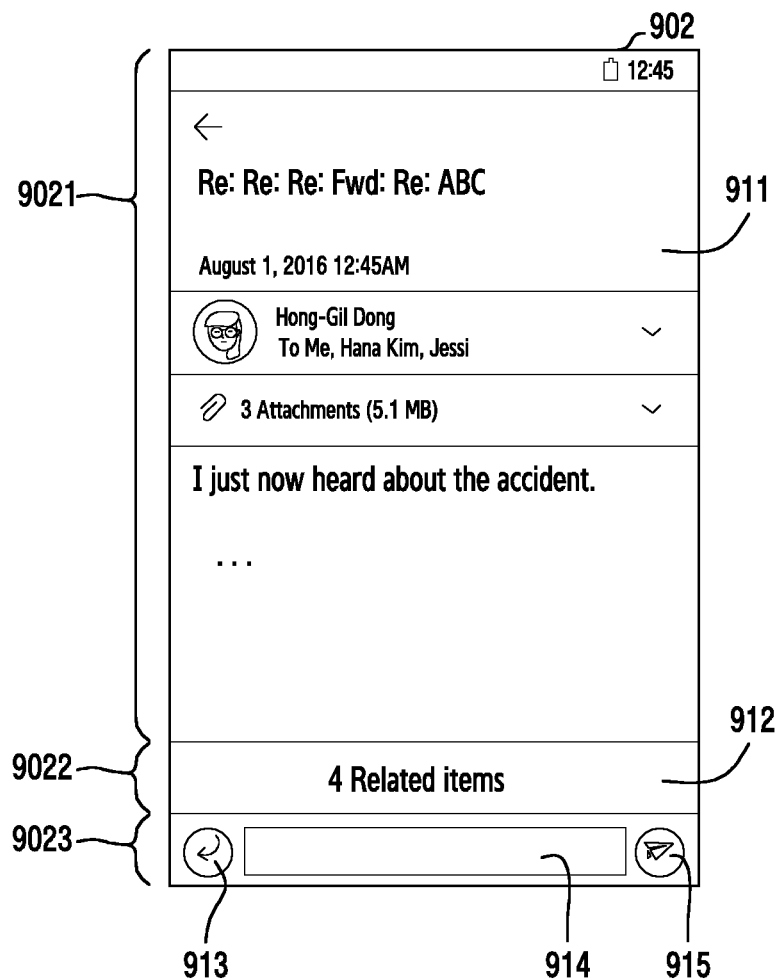
FIGS. 9A, 9B, 9C, 9D and 9E are diagrams illustrating example operations of FIG. 8 according to an example embodiment of the present disclosure.
Figure 9B:
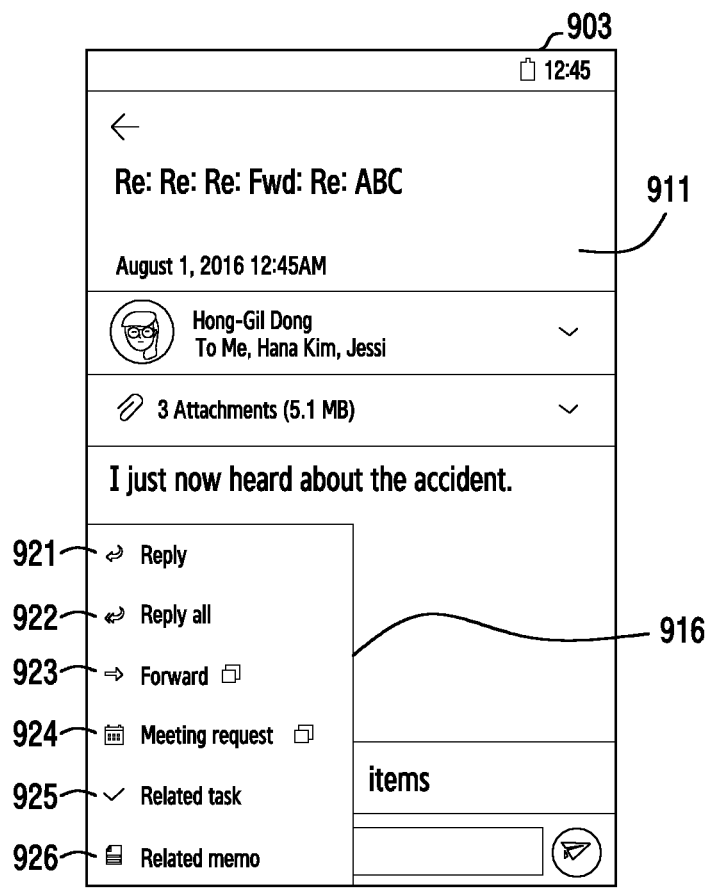

When a user input (e.g., a single tap) selects the first icon 913, the control unit 280 may display a list 916 on a screen 903 of FIG. 9B. The list 916 may provide items for, for example, selecting types of contents created in association with the read email content 911. The list 916 may provide the items for the content types created in association with the read email content 911, for example, Reply 921, Reply all 922, Forward 923, Meeting request 924, Related task 925, and a Related memo 926. The control unit 280 may not include a content type not created in association with the read content (e.g., the email content 911 of FIG. 9A) in the list 916. For example, the instruction of the contents management application 251 of FIG. 2 may define the content types which may be created in association with the read content displayed on the content reading screen.

In operation 803, the control unit 280 may determine whether a user input selects the content type. For example, when one item is touched in the list 916 of the screen 903 of FIG. 9B, the control unit 280 may select the content type indicated by the touched item.

Figure 9C:
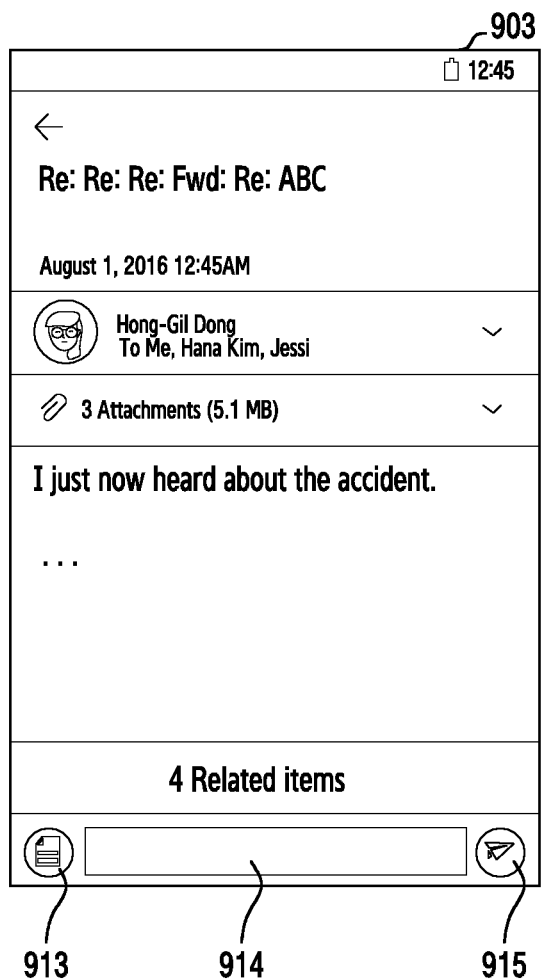
Figure 9D:
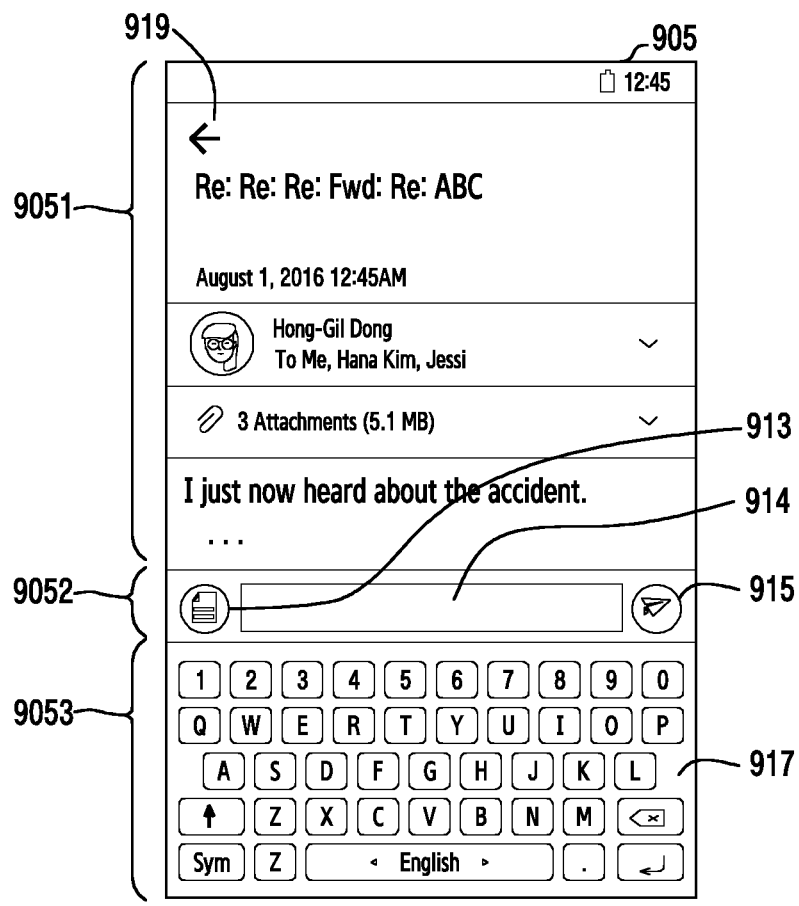
Figure 9E:
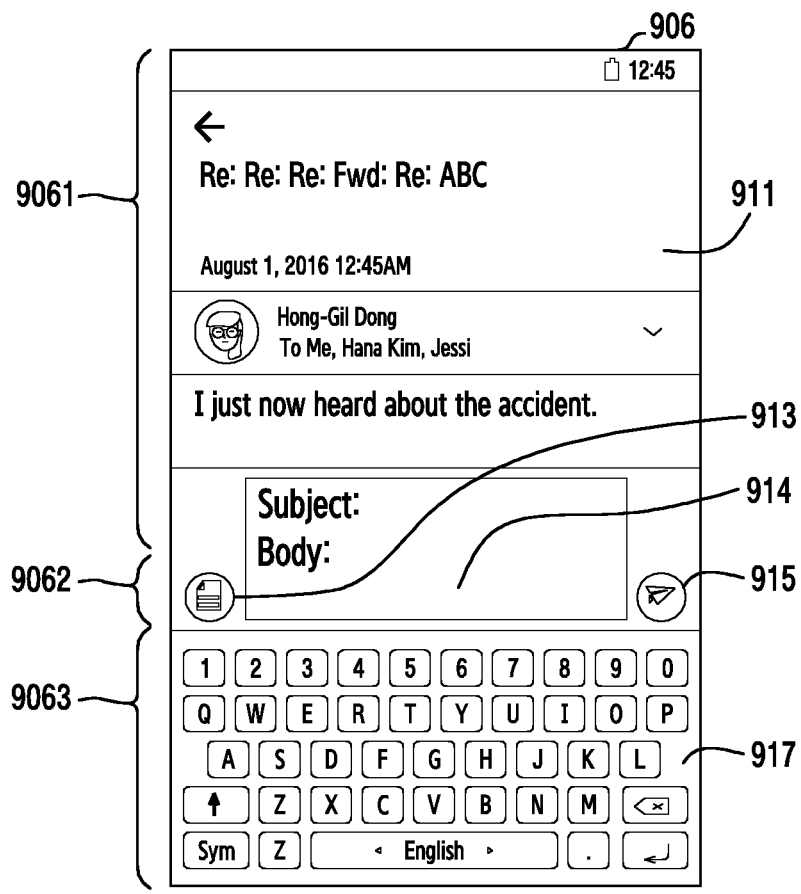

When the content type is selected, the control unit 280 may close the list 916. According to various embodiments, the control unit 280 may display an image corresponding to the selected content type at the first icon 913. For example, when the "Related memo" item is selected from the list 916 of the screen 903 of FIG. 9B, the control unit 280 may close the list 916 on a screen 904 as illustrated in FIG. 9C and display an image indicating the memo content type at the first icon.

In operation 805, the control unit 280 may execute an editor based on the selected content type. For example, when one of the Reply item 921, the Reply all item 922, and the Forward item 923 is selected in the list 914 of the screen 903 of FIG. 9B, the control unit 280 may execute the editor for creating an email content among various editors. According to various embodiments, the editor may provide various screens and GUI elements based on the type of the content to create.

In operation 807, the control unit 280 may create a related content based on a user input based on the executed editor. For example, when the input display region 914 is touched on the content reading screen 903 of FIG. 9C, the control unit 280 may provide a memo editor reading screen 905 of FIG. 9D. The memo editor reading screen 905 may include a first display region 9051, a second display region 9052, and a third display region 9053. The control unit 280 may display the read content 911 of FIG. 9A in the first display region 9051. The control unit 280 may display the first icon 913, the input display region 914, and the second icon 915 in the second display region 9052. The control unit 280 may display a keyboard 917 in the third display region 9053. According to various embodiments, the first display region 9051, the second display region 9052, and the third display region 9053 may be arranged vertically, and the second display region 9052 may be interposed between the first display region 9051 and the third display region 9053.

According to various embodiments, the control unit 280 may set the first display region 9051 as a scroll region. The first display region 9051 and the second display region 9052 may be adjusted. For example, when a touch input touches in between the first display region 9051 and the second display region 9052 and drags from the second display region 9052 toward the first display region 9051, the control unit 280 may reduce the first display region 9051 and relatively expand the second display region 9052 in size. For example, when a touch input touches in between the first display region 9051 and the second display region 9052 and drags from the first display region 9051 toward the second display region 9052, the control unit 280 may expand the first display region 9051 and relatively reduce the second display region 9052 in size. According to various embodiments, the control unit 280 may display a button 919 in the first display region 9051. When a region of the button 919 is touched, the control unit 280 may switch to the content reading screen 904 of FIG. 9C.

According to various embodiments, the control unit 280 may set the third display region 9053 as a touch input region. When detecting a user input through the keyboard in the third display region 9053, the control unit 280 may display an input text of the user input in the input display region 914 of the second display region 9052. When the second icon 915 of the second display region 9052 is touched, the control unit 280 may generate and store a memo content of a memo content format including the input text in the input display region 914 of the second display region 9052.

For example, when the item "Reply" is selected in the list 916 on the screen 903 of FIG. 9B, the control unit 280 may close the list 916 on the screen 906 as illustrated in FIG. 9A and display an image indicating an email content type at the first icon 913. When the input display region 914 is touched on the content reading screen 902 of FIG. 9A, the control unit 280 may provide the email editor reading screen 906 of FIG. 9E. The email editor reading screen 906 may include a first display region 9061, a second display region 9062, and a third display region 9063. The control unit 280 may display the read content 911 in the first display region 9061. The control unit 280 may display the first icon 913, the input display region 914, and the second icon 915 in the second display region 9062. The control unit 280 may display the keyboard 917 in the third display region 9063. According to various embodiments, the control unit 280 may display an email content format, for example, a subject, a recipient, and a body, in the second display region 9062. When detecting a user input based on the email content format through the keyboard 917 in the third display region 9063, the control unit 280 may display an input text of the user input in the input display region 914 of the second display region 9062. When the second icon 915 is touched in the second display region 9062, the control unit 280 may create and store the content of the input display region 914 of the second display region 9062 as an email content of the email content format, and send the email to the outside.

Although not depicted, the control unit 280 may create various related contents of the read content in various functions or actions based on the user input.

Figure 10:
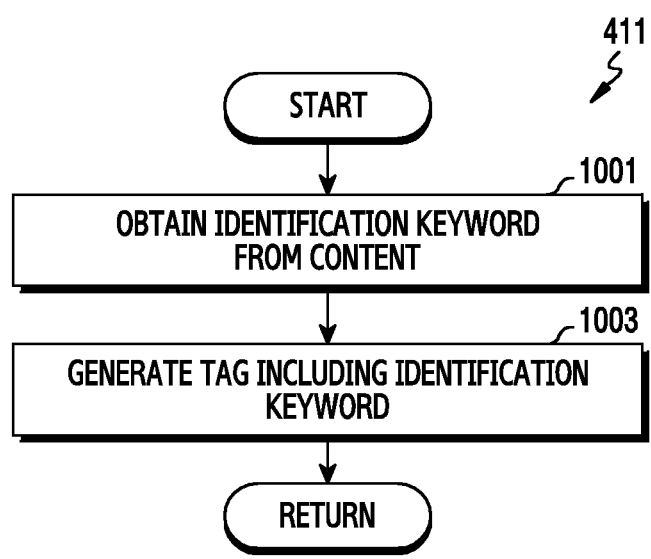
FIG. 10 is a flowchart illustrating an example of tag generation based on content information of FIG. 4 according to an example embodiment of the present disclosure.
Figure 11A:
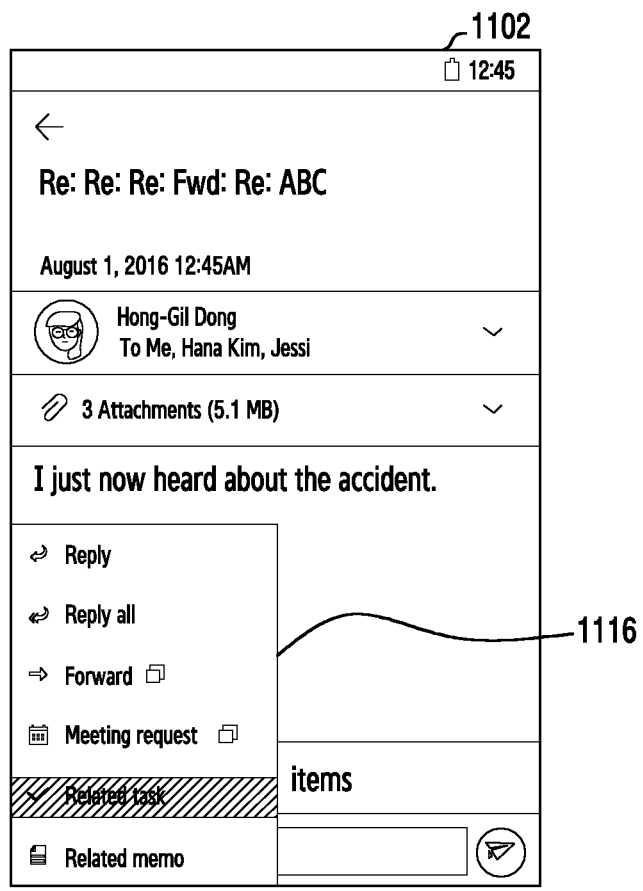
FIGS. 11A, 11B, and 11C are diagrams illustrating example operations of FIG. 10 according to an example embodiment of the present disclosure.
Figure 11B:
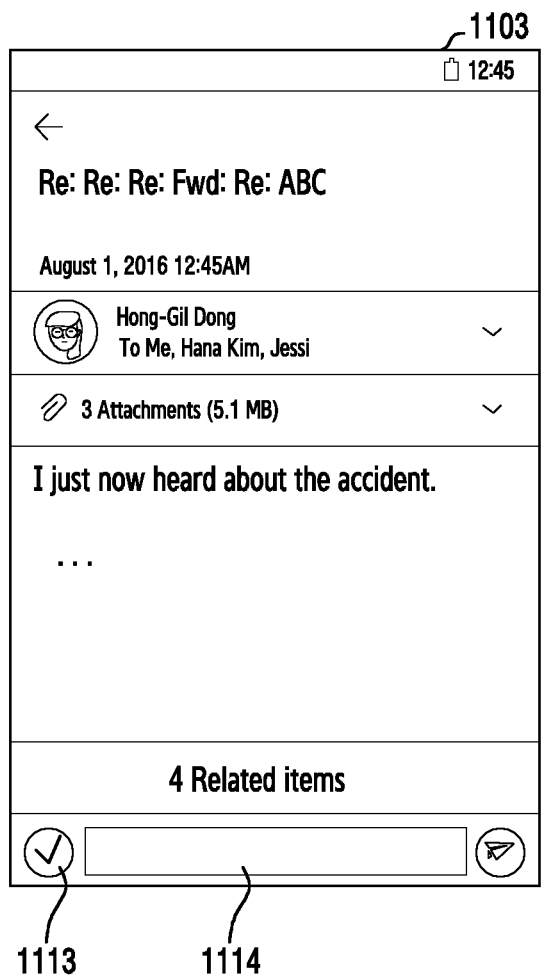
Figure 11C:
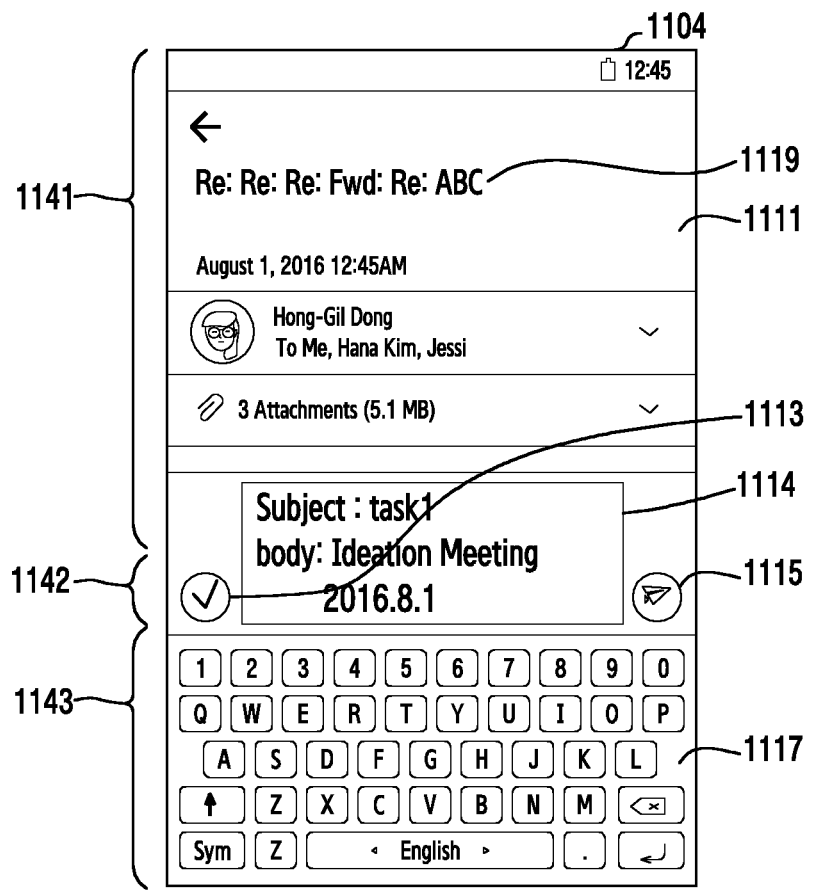

FIG. 10 is a flowchart illustrating an example method for generating a tag based on content information of FIG. 4 (e.g., operation 411) according to an example embodiment of the present disclosure. FIGS. 11A, 11B, and 11C are diagrams illustrating example operations of FIG. 10 according to an example embodiment of the present disclosure.

Referring to FIG. 10, the control unit 280 of FIG. 2 may obtain an identification keyword from a read content in operation 1001. For example, referring to FIG. 11A, when an item "Related task" is selected in a list 1116 of a content reading screen 1102, the control unit 280 may close the list 1116 on a screen 1103 of FIG. 11B and display an image indicating a task content type at a first icon 1113. When an input display region 1114 is touched on the content reading screen 1102 of FIG. 11B, the control unit 280 may provide a task editor reading screen 1104 for creating a task content of a task format of FIG. 11C. The task editor reading screen 1104 may include a first display region 1141, a second display region 1142, and a third display region 1143. The control unit 280 may display a read content 1111 in the first display region 1141. The control unit 280 may display the first icon 1113, an input display region 1114, and a second icon 1115 in the second display region 1142. The control unit 280 may display a keyboard 1117 in the third display region 1143, and, when detecting a touch input through the keyboard 1117, display an input text of a user input in the input display region 1114. When the second icon 1115 is touched in the second display region 1142, the control unit 280 may create and store a task content of a task format based on the text of the input display region 1142 of the second display region 1142. When creating and storing the task content, the control unit 280 may extract an identification keyword from at least part of the read content. According to an embodiment, the control unit 280 may extract the identification keyword from a subject of the read content. In FIG. 11C, a subject 1119 of the read email content 1111 may be a text "Re:Re:Re:Fwd:Re: ABC". In the subject 1119 including the text "Re:Re:Re: Fwd:Re: ABC", the text "ABC" is written by a user input, and other texts may be added automatically when other email content (e.g., a reply email content, a forward email content) associated with the email content is created. For example, when receiving an email content including the subject "ABC" from other party and creating and sending a reply email content based on a user input, the control unit 280 may add a text "Re:" indicating the reply to the subject of the reply email content, like "Re:ABC", without a separate user input. The other party may receive the email content with the subject "Re:ABC" and recognize the reply email content for its email content including the subject "ABC". For example, when receiving an email content including the subject "ABC" from the other party and creating and sending a forward email content based on a user input, the control unit 280 may add a text "Fwd:" indicating the forward to the subject of the forward email content, like "Fwd:ABC", without a separate user input. According to an embodiment, the control unit 280 may select the text ("ABC" in FIG. 11C) except for the text "Re:" or "Fwd:" as the identification keyword in the subject of the email content.

In operation 1003, the control unit 280 may generate a tag including the obtained identification keyword. The control unit 280 may create a task content including the subject of a text "task 1" and a body of texts "Ideation Meeting" and "2016.8.1" as illustrated in FIG. 11C. The generated task content may include the identification keyword "ABC" extracted in operation 1001. Although not depicted, when the created task content is read, the tag may or may not be displayed.

According to an example embodiment, a method for contents management in an electronic device may include generating a contents list based on a user input, detecting selection of a contents list entry in the contents list, and creating one or more contents related to a content of the selected contents list entry, when creating the one or more related contents, generating a tag based on at least part of the content corresponding to the selected contents list entry and adding the tag to the one or more related contents, and adding a contents list entry of the one or more related contents comprising the tag, to the contents list.

The tag may include at least one keyword of the content of the selected contents list entry.

Creating the related contents may include displaying a list of various content types, selecting a content type in the list, executing an editor based on the selected content type, and creating the related content according to a user input based on the executed editor.

The method may further include displaying the content of the selected contents list entry.

The method may further include, when displaying the content of the selected contents list entry, displaying an indicator indicating presence of the one or more related contents.

The method may further include displaying the content of the selected contents list entry in a first display region of a screen of the electronic device, and displaying the indicator in a second display region which is separated from the first display region.

The method may further include detecting selection of the indicator and displaying a list of contents list entries of the one or more related contents.

The method may further include, when one entry is selected in the displayed list, displaying the selected entry through a corresponding viewer.

The method may further include, when generating the contents list, collecting contents created using a plurality of applications installed on the electronic device.

The method may further include sending the created one or more contents to outside.

The term "module" as used in the present disclosure may include a unit including hardware, software, or firmware, and can be interchangeably used with terms, for example, such as "logic", "logical block", "component", "circuit", and the like. "module" can be a minimum unit of an integral component or a minimum unit for performing one or more functions or a part thereof "module" can be mechanically or electrically implemented. For example, "module" can include, for example, and without limitation, a dedicated processor, a CPU, an application-specific integrated circuit (ASIC) chip, a field-programmable gate arrays (FPGAs), or a programmable-logic device, which are known or will be developed, for performing certain operations. At least part of a device (e.g., modules or functions thereof) or a method (e.g., operations) according to various embodiments can be implemented with instructions stored in a computer-readable storage medium (e.g., the memory 130) as a program module. When the instruction is executed by a processor (e.g., the processor 120), the processor can perform a function corresponding to the instruction. The computer-readable recording medium can include a hard disk, a floppy disk, magnetic media (e.g., a magnetic tape), optical media (e.g., a compact disc (CD)-read only memory (ROM), a DVD), magneto-optical media (e.g., a floptical disk), and an internal memory. An instruction can include machine code made by a compiler or code executable by an interpreter. A module or a program module according to various embodiments can include at least one or more of the aforementioned components, omit some of them, or further include additional other components. Operations performed by a module, a program module, or other components according to various embodiments can be executed in a sequential, parallel, repetitive, or heuristic manner. At least some operations can be executed in a different order or be omitted, or other operations can be added.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

As set forth above, the contents management method and apparatus in the electronic device can open a content and easily create its related contents in various formats. Further, the user can more easily access the related contents and thus experience the enhanced convenience.

While the disclosure has been illustrated and described with reference to various example embodiments thereof, it will be understood by those skilled in the art that various changes in form and details may be made therein without departing from the spirit and scope of the disclosure as defined by the appended claims and their equivalents.

What is claimed is:

1. A method for contents management in an electronic device, comprising:
    generating, by a processor of the electronic device, a contents list;
    detecting, by the processor, selection of a contents list entry in the contents list based on a user input to a user interface (UI) of a first application displaying at least part of the contents list and the contents list entry on a screen of the electronic device, extracting identification information of the selected contents list entry, and creating, by the processor, one or more contents related to a content of the selected contents list entry based on the extracted identification information;
    generating, by the processor, a tag based on at least part of the content of the selected contents list entry and adding, by the processor, the tag to the one or more contents related to the content when creating the one or more contents related to the content;
    in response to the user input, controlling the first application to display the content of the selected contents list entry in a first scrollable display region of the screen of the electronic device and displaying, by the processor, an indicator indicating presence of the one or more contents related to the content external to the user interface (UI) of the first application and in a second scrollable display region of the screen separate from the first scrollable display region when displaying the content of the selected contents list entry;
    detecting, by the processor, selection of the indicator;
    adding, by the processor, a contents list entry of the one or more contents related to the content comprising the tag, to the contents list; and
    in response to the detection of selection of the indicator, simultaneously displaying on the screen of the electronic device (a) the content of the selected contents list entry in the first scrollable display region, and (b) a list of contents list entries of the one or more contents related to the content in the second scrollable display region,
    wherein the contents list entries of the one or more contents related to the content are classified and displayed based on content type of the one or more contents related to the content, and
    wherein the content of the selected contents list entry in the first scrollable display region is related to the first application, and the one or more contents related to the content in the second scrollable display region are related to a plurality of second applications different from the first application, so that scrollable regions from different applications are simultaneously displayed on the screen of the electronic device in the second scrollable display region.

2. The method of claim 1, wherein the tag comprises at least one keyword of the content of the selected contents list entry.

3. The method of claim 1, wherein creating the one or more contents related to the content comprises:
    displaying a list of various content types via the UI;
    selecting a content type in the list;
    executing an editor based on the selected content type; and
    creating the one or more contents related to the content according to a user input based on the executed editor.

4. The method of claim 1, further comprising:
    displaying an entry through a corresponding viewer when the entry is selected in the displayed list of content list entries.

5. The method of claim 1, further comprising:
    collecting, by the processor, contents created using the plurality of applications installed on the electronic device when generating the contents list.

6. The method of claim 1, further comprising:
sending, by the processor, the created one or more contents related to the content outside the electronic device.

7. An electronic device comprising:
a memory configured to store a plurality of contents; and
a processor electrically coupled with the memory,
wherein the memory stores instructions which, when executed by the processor, cause the processor to:
generate a contents list;
detect selection of a contents list entry in the contents list based on a user input to a user interface (UI) of a first application displaying at least part of the contents list and the contents list entry on a screen of the electronic device, extract identification information of the selected contents list entry, and to create one or more contents related to a content of the selected contents list, entry based on the extracted identification information;
generate a tag based on at least part of the content of the selected contents list entry and add the tag to the one or more contents related to the content when creating the one or more contents related to the content;
in response to the user input, control the first application to display the content of the selected contents list entry in a first scrollable display region of the screen of the electronic device and display an indicator indicating presence of the one or more contents related to the content external to the user interface (UI) of the first application and in a second scrollable display region of the screen separate from the first scrollable display region when displaying the content of the selected contents list entry;
detect selection of the indicator;
add a contents list entry of the one or more contents related to the content comprising the tag, to the contents list; and
in response to the detection of selection of the indicator, simultaneously display on the screen of the electronic device (a) the content of the selected contents list entry in the first scrollable display region, and (b) a list of contents list entries of the one or more contents related to the content in the second scrollable display region;
wherein the contents list entries of the one or more contents related to the content are classified and displayed based on content type of the one or more contents related to the content, and
wherein the content of the selected contents list entry is related to the first application and the one or more contents related to the content are related to a plurality of second applications different from the first application, so that scrollable regions from different applications can be simultaneously displayed on the screen of the electronic device in the second scrollable display region.

8. The electronic device of claim 7, wherein the instructions, when executed by the processor, cause the processor to generate the tag comprising at least one keyword of the content of the selected contents list entry.

9. The electronic device of claim 7, wherein the instructions, when executed by the processor, cause the processor to display a list of various content types via the UI, to select a content type in the list, to execute an editor based on the selected content type, and to create the one or more contents related to the content according to a user input based on the executed editor.

10. The electronic device of claim 7, wherein the instructions, when executed by the processor, cause the processor to display an entry through a corresponding viewer when the entry is selected in the displayed list of contents list entries.

11. The electronic device of claim 7, wherein the instructions, when executed by the processor, cause the processor to collect contents created using the plurality of applications installed on the electronic device when generating the contents list.

12. The electronic device of claim 7, wherein the instructions, when executed by the processor, cause the processor to send the created one or more contents related to the content outside the electronic device.

* * * * *